(12) United States Patent
Tsuchiya et al.

(10) Patent No.: US 9,247,758 B2
(45) Date of Patent: Feb. 2, 2016

(54) TASTE-IMPROVING AGENT AND FOOD OR DRINK CONTAINING SAME

(71) Applicant: NIPPON SUISAN KAISHA, LTD., Tokyo (JP)

(72) Inventors: Kanako Tsuchiya, Toyko (JP); Masashi Shimono, Tokyo (JP); Akiko Ichikawa, Tokyo (JP); Kiminori Sugiyama, Tokyo (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 14/362,526

(22) PCT Filed: Dec. 6, 2012

(86) PCT No.: PCT/JP2012/081712
§ 371 (c)(1),
(2) Date: Jun. 3, 2014

(87) PCT Pub. No.: WO2013/085014
PCT Pub. Date: Jun. 13, 2013

(65) Prior Publication Data
US 2015/0125589 A1    May 7, 2015

(30) Foreign Application Priority Data

Dec. 6, 2011  (JP) .................. 2011-267380

(51) Int. Cl.
*A23L 1/221* (2006.01)
*A23L 1/22* (2006.01)
(Continued)

(52) U.S. Cl.
CPC ............. *A23L 1/22075* (2013.01); *A23L 1/221* (2013.01); *A23L 1/2215* (2013.01);
(Continued)

(58) Field of Classification Search
CPC . A23L 1/22083; A23L 1/22075; A23L 1/221; A23L 1/22091; A23V 2250/21; A23V 2250/2117
USPC .................... 426/74, 615, 650, 662
See application file for complete search history.

(56) References Cited

U.S. PATENT DOCUMENTS

2003/0161879 A1  8/2003  Ohmori et al.
2006/0088649 A1  4/2006  Ganesan et al.
(Continued)

FOREIGN PATENT DOCUMENTS

EP  0 924 996  4/2002
EP  2 305 048  4/2011
(Continued)

OTHER PUBLICATIONS

Derwent-ACC-No. 2006-789889 (abstract only) 2006, one page.*
(Continued)

*Primary Examiner* — Helen F Heggestad
(74) *Attorney, Agent, or Firm* — Hamre, Schumann, Mueller & Larson, P.C.

(57) ABSTRACT

Provided is a taste improver that improves or decreases unpleasant bitterness, astringent taste, harsh taste, bitter taste, or the like that results from potassium salts, magnesium salts, calcium salts, and ammonium salts without adversely affecting savoriness of a food or drink. The taste improver includes a vegetable extract and/or a phospholipid. In the taste improver, the aforementioned vegetable extract includes a vegetable-derived glycoside and/or glycoside aglycone. In the taste improver, the aforementioned phospholipid is phosphatidylcholine, phosphatidylserine, phosphatidylethanolamine, phosphatidylinositol, and/or a lyso form thereof. Arginine is further added to the aforementioned taste improver. Trehalose and/or hydrogenated starch syrup are further added to the taste improver. A manufacturing method of such and an improvement method for the unpleasant bitterness, astringent taste, harsh taste, bitter taste, or the like caused by potassium salts, magnesium salts, calcium salts, and ammonium salts using these taste improvers. A food or drink including these taste improvers.

19 Claims, 18 Drawing Sheets

(51) Int. Cl.
    *A23L 2/52*   (2006.01)
    *A23L 1/237*  (2006.01)
    *A23L 1/30*   (2006.01)
(52) U.S. Cl.
    CPC ........ *A23L 1/22083* (2013.01); *A23L 1/22091* (2013.01); *A23L 1/237* (2013.01); *A23L 1/3002* (2013.01); *A23L 2/52* (2013.01); *A23V 2002/00* (2013.01)

(56) References Cited

U.S. PATENT DOCUMENTS

| | | | |
|---|---|---|---|
| 2007/0292593 A1* | 12/2007 | Ganesan et al. | 426/649 |
| 2008/0193591 A1 | 8/2008 | Wada et al. | |
| 2009/0004332 A1 | 1/2009 | Katzir et al. | |
| 2009/0117254 A1* | 5/2009 | Chigurupati | 426/622 |
| 2010/0136196 A1 | 6/2010 | Sato et al. | |
| 2011/0104361 A1 | 5/2011 | Miyazawa et al. | |
| 2011/0269851 A1 | 11/2011 | Bortlik et al. | |
| 2012/0088024 A1 | 4/2012 | Saito et al. | |
| 2012/0231141 A1 | 9/2012 | Kurobayashi et al. | |
| 2013/0295180 A1* | 11/2013 | Minter et al. | 424/489 |

FOREIGN PATENT DOCUMENTS

| | | |
|---|---|---|
| JP | 3-155766 | 7/1991 |
| JP | 4-108358 | 4/1992 |
| JP | 4-262758 | 9/1992 |
| JP | 5-316964 | 12/1993 |
| JP | 8-009896 | 1/1996 |
| JP | 8-009897 | 1/1996 |
| JP | 8-070814 | 3/1996 |
| JP | 8-173093 | 7/1996 |
| JP | 10-146165 | 6/1998 |
| JP | 11-103823 | 4/1999 |
| JP | 11-187841 | 7/1999 |
| JP | 2003-079337 | 3/2003 |
| JP | 2006-081544 | 3/2006 |
| JP | 2006-238828 | 9/2006 |
| JP | 2006-296357 | 11/2006 |
| JP | 2007-129936 | 5/2007 |
| JP | 2007-267724 | 10/2007 |
| JP | 2008-061511 | 3/2008 |
| JP | 2008-510469 | 4/2008 |
| JP | 2008-289426 | 12/2008 |
| JP | 2009-136266 | 6/2009 |
| JP | 2009-254247 | 11/2009 |
| JP | 2010-004767 | 1/2010 |
| JP | 2010-514440 | 5/2010 |
| JP | 4634886 B | 11/2010 |
| JP | 2011-015632 | 1/2011 |
| JP | 2011-030535 | 2/2011 |
| JP | 2011-072307 | 4/2011 |
| JP | 2011-103774 | 6/2011 |
| JP | 2011-130669 | 7/2011 |
| WO | 2006/114918 | 11/2006 |
| WO | 2010/034642 | 4/2010 |

OTHER PUBLICATIONS

Office Action issued in corresponding Chinese Application No. 201280060026.4, Apr. 28, 2015, 28 pages, with an English translation.

Wiczkowski, "Quercetin from Shallots (Allium capa L. var. aggregatum) Is More Bioavailable than its Glucosides", The Journal of Nutrition, Nutrient Physiology, Metabolism, and Nutrient-Nutrient Interactions, Dec. 31, 2008, pp. 885-888.

Benavente-Garcia, et al., "Uses and Properties of Citrus Flavonoids", Jounal of Agricultural and Food Chemistry, vol. 45, No. 12, Dec. 1997, pp. 4505-4515.

Extended European Search Report issued in corresponding European Application No. 12856232.9, Jul. 6, 2015, 11 pages.

* cited by examiner

TASTE-IMPROVING AGENT AND FOOD OR DRINK CONTAINING SAME

TECHNICAL FIELD

The present invention relates to a taste improver for selective improvement or lowering of unpleasant bitterness (Nigami), astringent taste (Sibumi), harsh taste Egumi), bitter taste (Shurenmi), or the like caused by potassium salts, magnesium salts, calcium salts, and ammonium salts; a potassium salt taste improvement method using the taste improver; and a food or drink containing the taste improver.

BACKGROUND ART

Table salt (sodium chloride) is an essential nutrient for human beings. For example, table salt plays an important role in functions as exemplified by control of bodily internal water content, pH, and osmotic pressure, digestion of foods, absorption of nutrients, neurotransmission, muscle activity, or the like. Table salt has a wide variety of roles in foodstuffs. Examples of such roles include enhancement of delicious taste or savoriness, imparting texture, retention of color, or the like. The effect on flavor of foodstuffs is great, and the addition of table salt enhances sweetness and delicious taste, and decreases unpleasant bitterness. However, excessive intake of table salt is thought to increase the risk of occurrence of lifestyle-related diseases such as high blood pressure, kidney disease, heart disease, cancer, or the like. From the standpoint of prevention of increased risk of lifestyle-related diseases due to excessive intake of table salt, in the "Japanese Dietary Intake Standard (2010 edition)", the Ministry of Health, Labor and Welfare sets a target intake of table salt for an adult of less than 9.0 g/day for men and less than 7.5 g/day for women. The amount of table salt intake by adults according to the 2009 national nutrition and health survey was 11.6 g/day for men and 9.9 g/day for women, and this intake has not been reduced to the target values, which continue to be lowered year by year. The WHO and International Society of Hypertension guidelines recommend less that 6.0 g/day table salt intake.

Simply decreasing the utilized amount of table salt in food or drink flavoring and processing has been considered as a method to decrease the intake of table salt. However, as mentioned above, table salt plays an important role in determination of quality of foodstuffs. Thus, savoriness is harmed and flavor is lost in a food or drink in which the utilized amount of table salt is simply decreased during flavoring and processing. For the development of low-salt foodstuffs, it is most important to attain both robust saltiness and delicious flavor even though table salt content has been reduced. There is a strong need to develop technology to realize such attainment.

By addition of a non-table salt substance that has saltiness, it is possible to make up for the low saltiness that occurs when table salt is decreased. Known examples of substances that have saltiness include potassium salts such as potassium chloride or the like, magnesium salts such as magnesium chloride or the like, calcium salts such as calcium chloride or the like, and ammonium salts such as ammonium chloride or the like. In comparison to sodium chloride, these substances are characterized by having weak saltiness and having unpleasant bitterness, astringent taste, harsh taste, bitter taste, or the like. Moreover, although considerable research has been performed at the molecular level relating to taste sensing, the detailed sensing mechanisms for the expression of such saltiness or bitterness, astringent taste, harsh taste, bitter taste, or the like by such salt substitute substances have not been resolved. Known examples of technologies for using such salt substitute substances, decreasing table salt, and suppressing non-salty unpleasant tastes include: a flavoring composition that mixes potassium chloride, ammonium chloride, calcium lactate, sodium L-aspartate, L-glutamic acid salts, and/or nucleic acid type flavoring substances at specific ratios (Patent Document 1); a method for suppression of the bitterness of potassium chloride by combination with a calcium salt or magnesium salt of an organic acid (Patent Document 2); a taste improver of a potassium chloride-containing food or drink that uses a basic amino acid (such as histidine, arginine, and lysine) and/or basic peptide (such as anserine, carnosine, and balenine) as an active ingredient (Patent Document 3); a taste improver for potassium salts that contains poly-γ-glutamic acid or a salt thereof (Patent Document 4); a mineral taste improver that includes a sugar phosphate ester (Patent Document 5); a method for removal of bitterness of potassium chloride by combined use with carrageenan (Patent Document 6); a table salt substitute that blends with potassium chloride at specific ratios sodium gluconate and/or potassium gluconate, and whey mineral (Patent Document 7); a powder flavoring that contains at specific ratios sodium, a non-sodium alkali metal or an alkaline earth metal, and a flavonoid (Patent Document 8); a method of use of trehalose for suppression of bitterness and/or metallic flavor of potassium chloride (Patent Document 9); a taste improver for potassium salt or a potassium salt-containing food or drink that includes quinic acid or quinic acid-containing composition, spilanthol or spilanthol-containing plant extract or refined plant oil, and *Allium* plant extract (Patent Document 10); or the like. However, it has not been possible to sufficiently suppress unpleasant non-salty taste, and due to unpleasant flavor or the like derived from the taste improvement materials, technology for meeting the needs of consumers has not been achieved.

On the other hand, substances other than potassium salts, magnesium salts, calcium salts, and ammonium salts that have unpleasant bitterness, astringent taste, harsh taste, bitter taste, or the like are exemplified by: alkaloids such as quinine and caffeine; polyphenols such as catechin and tannin; protein hydrolyzation products such as peptides and amino acids; and sweeteners such as aspartame, sucralose, acesulfame potassium, and neotame. As a technology for suppression of such unpleasant flavors, the following are disclosed: the suppression of bitterness of grapefruit juice, coffee, and quinine hydrochloride by use of a bitterness suppression agent that contains phosphatidic acid and phosphatidyl inositol (Patent Document 11); a bitterness-reduction agent containing an acidic phospholipid or its lyso form as a bitterness reduction component for the reduction of bitterness of quinine hydrochloride and quinine sulfate (Patent Document 12); a composition for foodstuffs that includes a bitter-tasting substance selected from the group consisting of bitter amino acids and bitter peptides, and a phospholipid selected from the group consisting of acidic phospholipids and lyso forms thereof (Patent Document 13); a highly sweet sweetening agent taste improver that includes solvent extract of roasted coffee (Patent Document 14); a highly sweet sweetener taste improver that includes vicenin-2 (Patent Document 15); a drink that has taste improved by a high sweetness sweetening agent that includes vegetable juice (tomato, carrot, or celery) and alcohol (Patent Document 16); a high sweetness sweetening agent taste improver that includes ginger extract and at least one oil selected from the group consisting of caraway essential oil, peppermint tail essential oil, cardamom essential oil, nutmeg extract, and hop essential oil (Patent Document 17); a bitterness suppression agent for quinine sulfate that has as an active ingredient a mammal-derived collagen peptide that has an average molecular weight of 500 to 4,500 (Patent Document 18); a method for lowering of bitterness of a turmeric extract or basidiomycetes extract that uses a neutral phospholipid derived from a natural substance (Patent Document 19). However, the technologies described in the aforementioned Patent Documents 11 to 19 are not developed from the standpoint of improvement of the taste of potassium salts, magnesium salts, calcium salts, and ammonium salts. Due to differences in affinity toward solvents, it is thought that the mechanism for sensing unpleasant bitterness, astringent taste, harsh taste, bitter taste, or the like is different.

CITATION LIST

Patent Literature

Patent Document 1: Japanese Unexamined Patent Application Publication No. H11-187841
Patent Document 2: Japanese Unexamined Patent Application Publication No. 1104-108358
Patent Document 3: WO2006/114918
Patent Document 4: Japanese Unexamined Patent Application Publication No. 2009-136266
Patent Document 5: Japanese Unexamined Patent Application Publication No. 2003-79337
Patent Document 6: Japanese Unexamined Patent Application Publication No. H04-262758
Patent Document 7: Japanese Unexamined Patent Application Publication No. 2008-289426
Patent Document 8: Japanese Unexamined Patent Application Publication No. 2007-267724
Patent Document 9: Japanese Unexamined Patent Application Publication (Translation of PCT Application) No. 2008-510469
Patent Document 10: Japanese Unexamined Patent Application Publication No. 2010-004767
Patent Document 11: Japanese Unexamined Patent Application Publication No. 2007-129936
Patent Document 12: Japanese Unexamined Patent Application Publication No. H08-009897
Patent Document 13: Japanese Unexamined Patent Application Publication No. H08-173093
Patent Document 14: Japanese Unexamined Patent Application Publication No. 2006-081544
Patent Document 15: Japanese Unexamined Patent Application Publication No. 2006-238828
Patent Document 16: Japanese Unexamined Patent Application Publication No. 2009-254247
Patent Document 17: Japanese Unexamined Patent Application Publication No. 2011-030535
Patent Document 18: Japanese Unexamined Patent Application Publication No. 2011-015632
Patent Document 19: Japanese Patent No. 4634886B

SUMMARY OF THE INVENTION

Technical Problem

An object of the present invention is to provide a taste improver for selectively improving or reducing the unpleasant bitterness, astringent taste, harsh taste, bitter taste, or the like caused by potassium salts, magnesium salts, calcium salts, and ammonium salts. A further object of the present invention is to provide a taste improvement method for potassium salts, magnesium salts, calcium salts, and ammonium salts that uses this taste improver. A further object of the present invention is to provide a food or drink containing the taste improver.

Solution to Problem

The gist of the present invention is the below listed (1) to (17) taste improvers, taste improvement methods, and taste-improved foods or drinks.

(1) A taste improver for a foodstuff comprising a potassium salt, a magnesium salt, a calcium salt, and/or an ammonium salt, the taste improver comprising as an active ingredient a vegetable extract and/or a phospholipid.

(2) The taste improver according to (1), wherein the vegetable extract includes a vegetable-derived glycoside and/or an aglycone thereof.

(3) The taste improver according to (1), wherein the vegetable extract comprises apigenin, daidzin, rutin, and/or a glycoside thereof.

(4) The taste improver according to (1) or (2), wherein the vegetable extract is an extract of any of paprika, asparagus, burdock, garlic, tomato, bitter melon, parsley, green soybean, purple-fleshed sweet potato, carrot, garland *chrysanthemum*, spinach, barley grass, Angelica keiskei, mulberry leaves, Japanese radish, onion, Corchorus olitorius, green onions, kale, yam, broccoli, green pepper, and celery.

(5) The taste improver according to any one of (1) to (4), wherein the vegetable extract is extracted using water and/or ethanol.

(6) The taste improver according to (1), wherein the phospholipid is phosphatidylcholine, phosphatidylserine, phosphatidylethanolamine, phosphatidylinositol, and/or a lyso form thereof.

(7) The taste improver according to (6), wherein the phospholipid comprises: any of phosphatidylcholine, phosphatidylserine, phosphatidylethanolamine, and phosphatidylinositol; and any of lyso forms thereof.

(8) The taste improver according to (6) or (7), wherein the phospholipid is an extract of plant, animal, and/or fungus.

(9) The taste improver according to any one of (1) to (8), wherein the taste improver further comprises a basic amino acid.

(10) The taste improver according to (9), wherein the basic amino acid is arginine. (11) The taste improver according to any one of (1) to (10), wherein the taste improver further comprises a saccharide.

(12) The taste improver according to (11), wherein the saccharide is trehalose and/or a hydrogenated starch syrup.

(13) A taste improvement method for a foodstuff comprising a predetermined amount or more of a potassium salt, a magnesium salt, a calcium salt, and/or an ammonium salt, the taste improvement method comprising adding the taste improver according to any one of (1) to (12).

(14) The method according to (13), wherein the taste improver is added to the foodstuff so that, upon adding the taste improver to the foodstuff, concentration in the foodstuff of the vegetable extract in the taste improver is from 0.001 to 1 percent by weight in terms of solid material content of the vegetable extract, or from 0.001 to 1 percent by weight in terms of a phospholipid.

(15) The method according to (14), wherein, upon adding a saccharide and/or a basic amino acid to the foodstuff together with the vegetable extract and/or the phospholipid as the taste improver, from 2 to 100 parts by weight of the saccharide is added per 1 part by weight of the added vegetable extract and/or phospholipid, and/or from 0.1 to 10 parts by weight of the basic amino acid is added per 1 part by weight of the added vegetable extract and/or phospholipid, respectively.

(16) A food or drink to which the taste improver according to any one of (1) to (12) is added, comprising a predetermined amount or more of a potassium salt, a magnesium salt, a calcium salt, and/or an ammonium salt.

(17) The food or drink of (16), comprising a vegetable extract on a solid basis in an amount from 0.01 to 0.5 percent by weight and/or a phospholipid in an amount from 0.01 to 0.5 percent by weight, wherein concentration of potassium in the food or drink is from 0.4 to 10.0 percent by weight.

Advantageous Effects of Invention

The taste improver of the present invention has the effect of improving or reducing unpleasant bitterness, astringent taste, harsh taste, bitter taste, or the like that has resulted from a potassium salt, magnesium salt, calcium salt, or ammonium salt. Thus, by use of the taste improver of the present invention, it is possible to decrease the used amount of sodium salt because, even part of sodium salt within the food or drink, especially sodium chloride, has been replaced by a potassium salt, magnesium salt, calcium salt, or ammonium salt, the taste improver can evoke a good salty taste that is equivalent to that before the replacement. Furthermore, even when the food or drink contains over a certain amount of the potassium salt, magnesium salt, calcium salt, or ammonium salt, it is possible to obtain a food or drink that has good savoriness.

DESCRIPTION OF EMBODIMENTS

Figure 1:
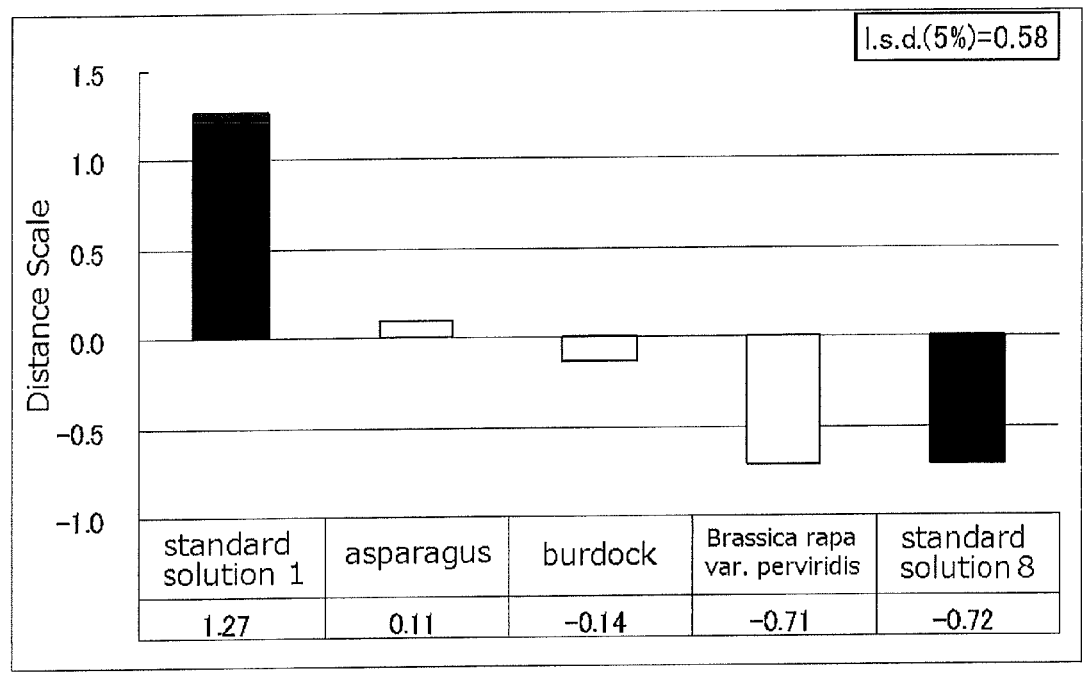
FIG. 1 shows the potassium chloride taste improvement effect of extracts of asparagus, burdock, and Brassica rapa var. perviridis in Working Example 1.
Figure 2:
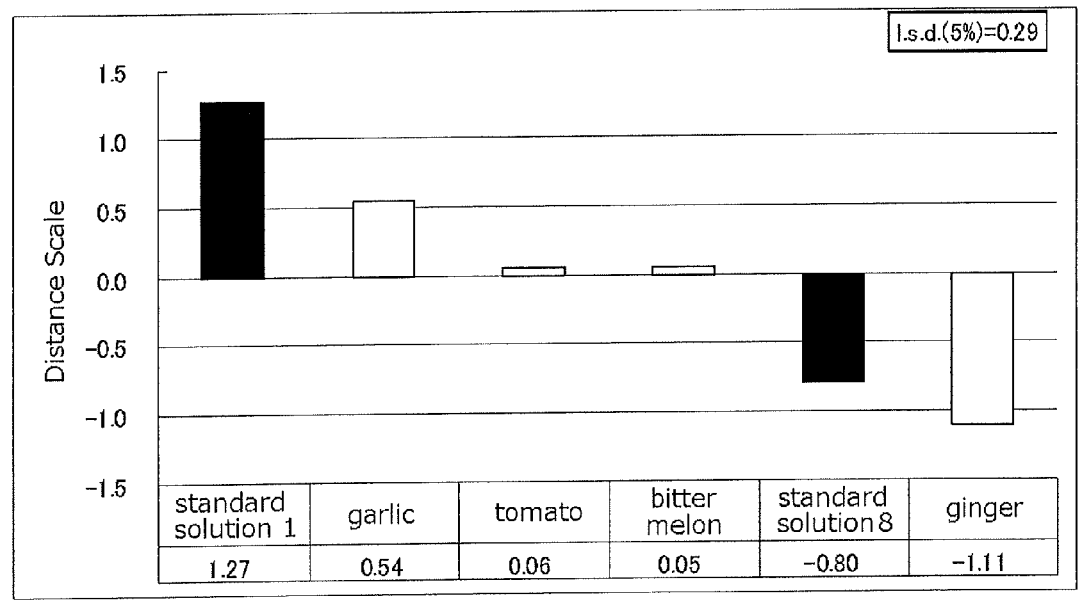
FIG. 2 shows the potassium chloride taste improvement effect of extracts of garlic, tomato, bitter melon, and ginger in Working Example 1.
Figure 3:
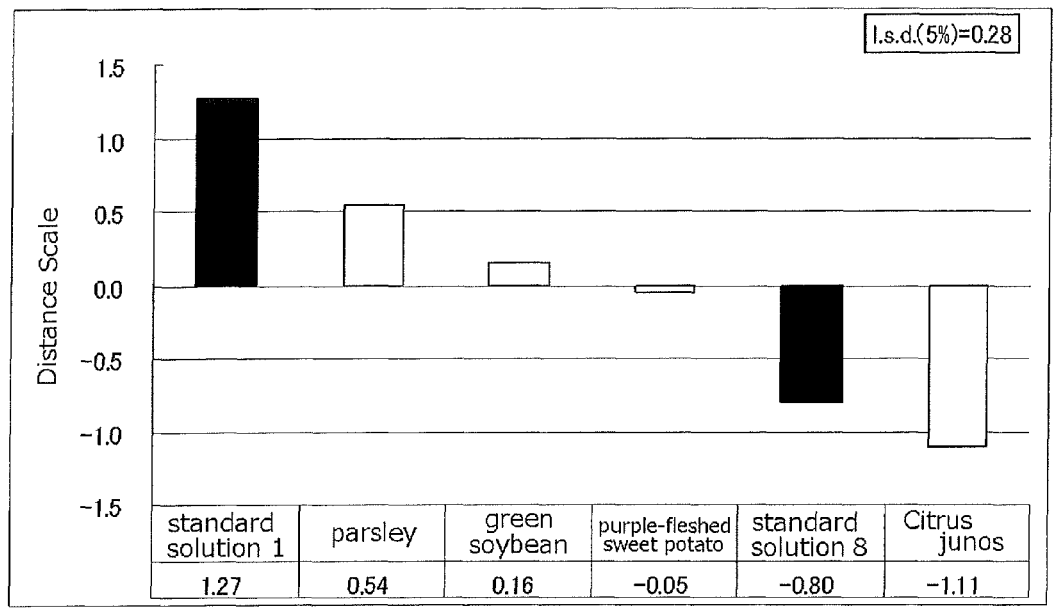
FIG. 3 shows the potassium chloride taste improvement effect of extracts of parsley, green soybean, purple-fleshed sweet potato, and Citrus junos in Working Example 1.
Figure 4:
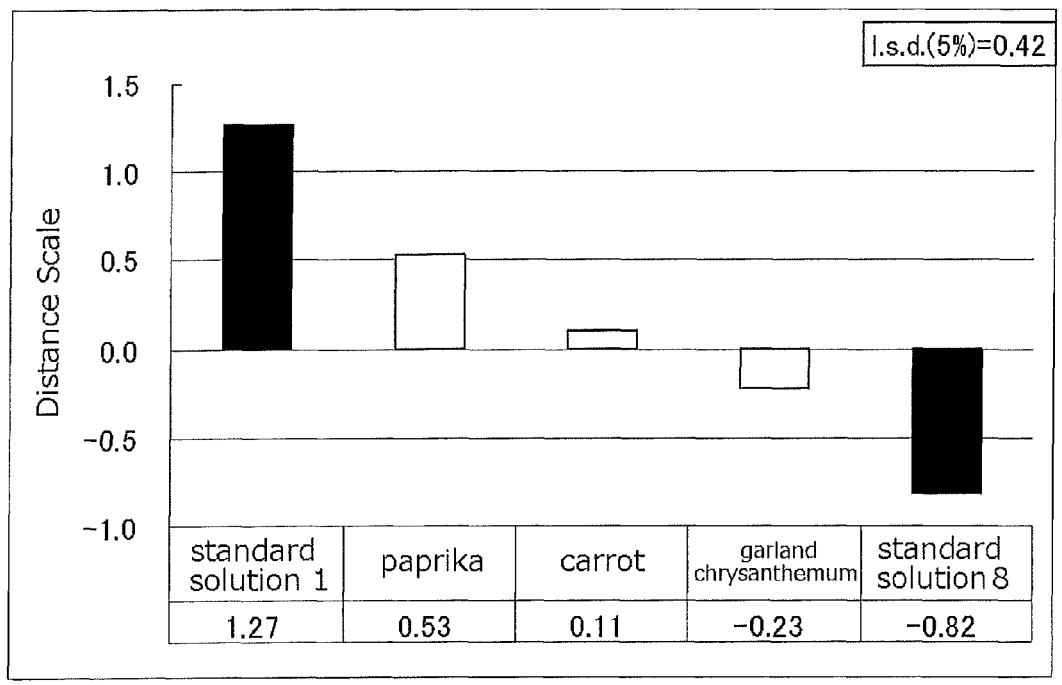
FIG. 4 shows the potassium chloride taste improvement effect of extracts of paprika, carrot, and garland chrysanthemum in Working Example 1.
Figure 5:
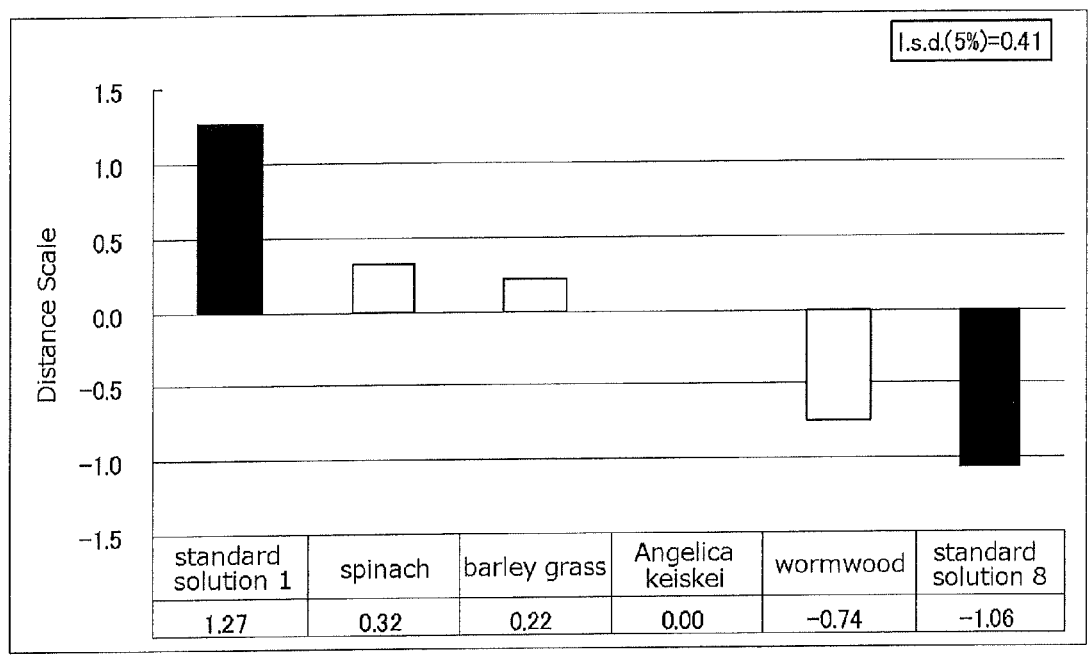
FIG. 5 shows the potassium chloride taste improvement effect of extracts of spinach, barley grass, Angelica keiskei, and wormwood in Working Example 1.
Figure 6:
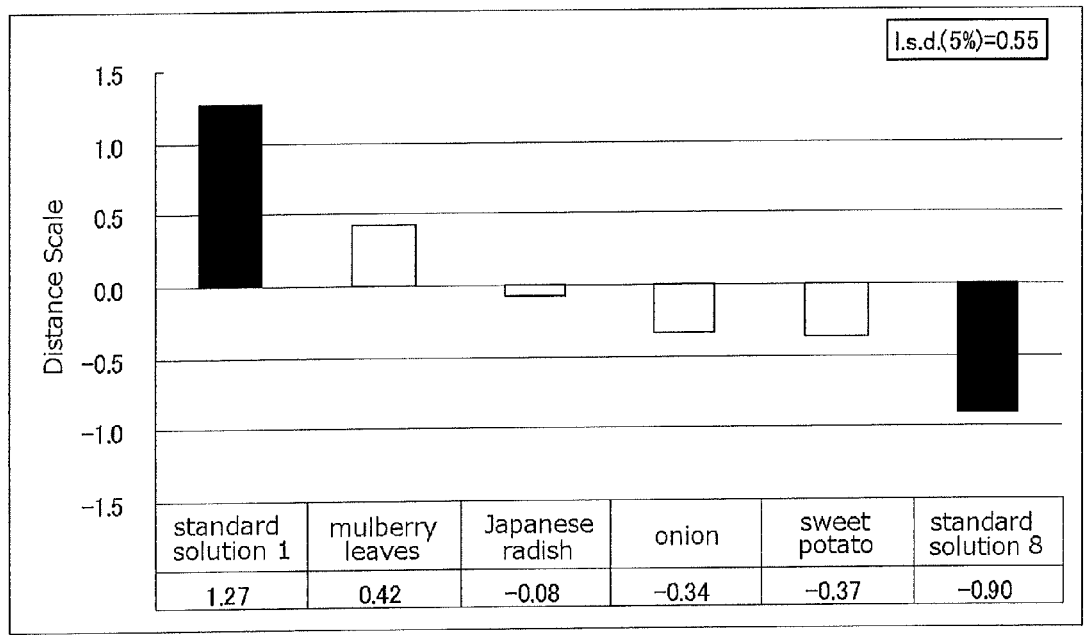
FIG. 6 shows the potassium chloride taste improvement effect of extracts of mulberry leaves, Japanese radish, onion, and sweet potato in Working Example 1.
Figure 7:
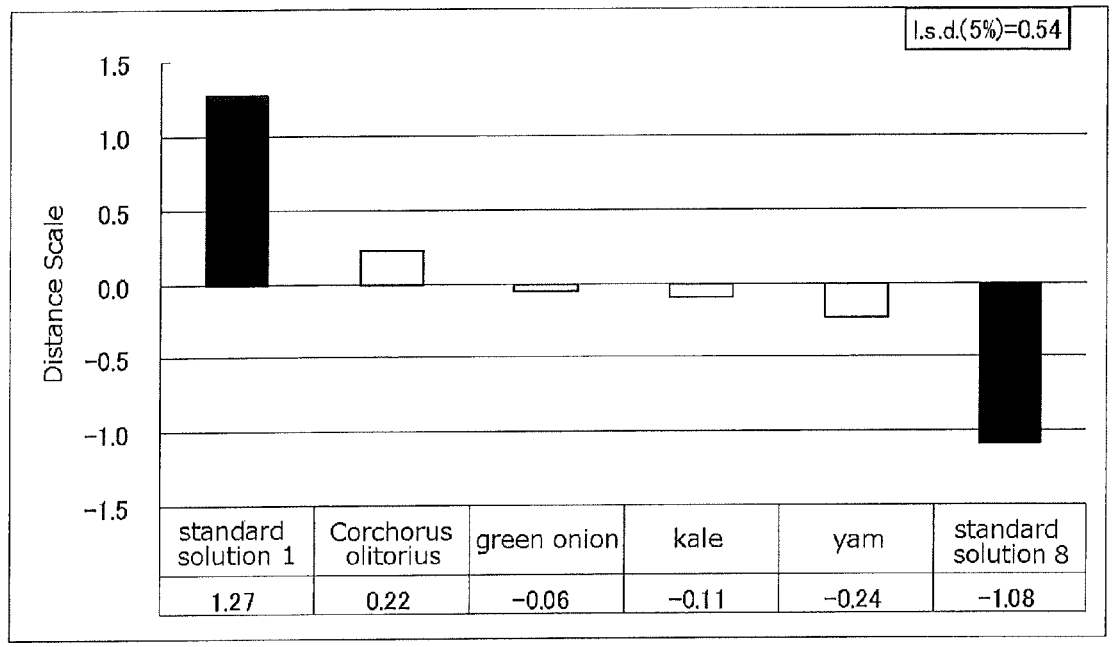
FIG. 7 shows the potassium chloride taste improvement effect of extracts of Corchorus olitorius, green onion, kale, and yam in Working Example 1.
Figure 8:
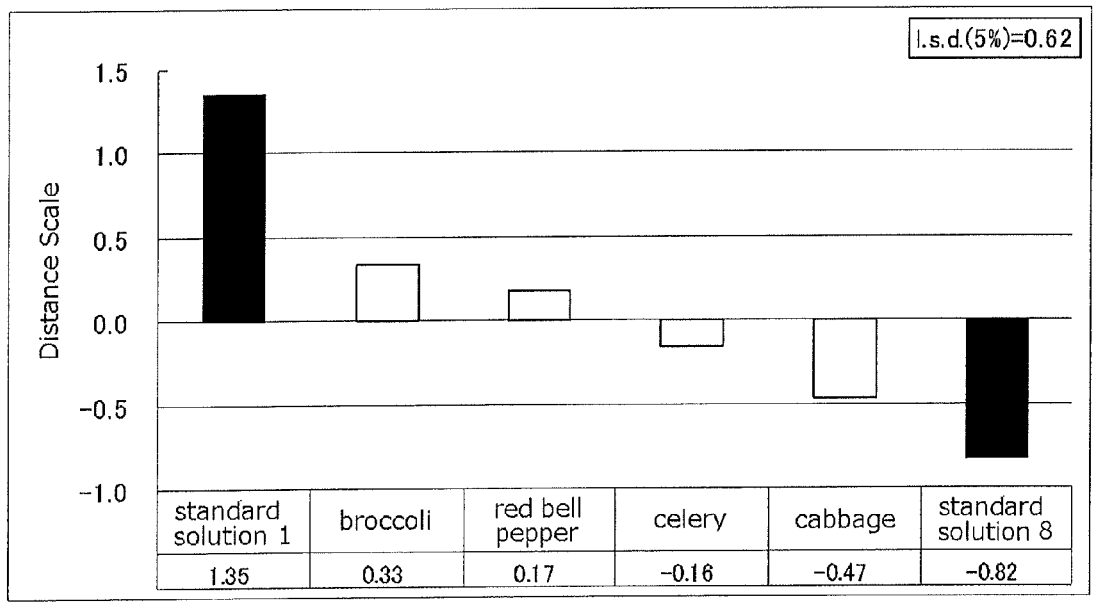
FIG. 8 shows the potassium chloride taste improvement effect of extracts of broccoli, red bell pepper, celery, and cabbage in Working Example 1.

The present invention is a taste improver for selective improvement or lowering of unpleasant bitterness, astringent taste, harsh taste, bitter taste, or the like caused by potassium salts, magnesium salts, calcium salts, and ammonium salts, wherein the taste improver includes at least one type of vegetable extract or phospholipid. Hereinafter, the expression "unpleasant bitterness, astringent taste, harsh taste, bitter taste, or the like" will also be referred to as "unpleasant flavor".

No particular limitation is placed on the potassium salt in the present invention as long as the potassium salt is edible. The potassium ion may be an inorganic acid salt, organic acid salt, nucleic acid salt, or amino acid salt. The potassium salt may be monovalent or multivalent. Specific examples of the utilized potassium salt include: potassium chloride, potassium carbonate, potassium hydrogen carbonate, potassium sulfate, potassium nitrite, potassium phosphate, dipotassium hydrogen phosphate, potassium dihydrogen phosphate, potassium polyphosphate, potassium metaphosphate, potassium acetate, potassium lactate, potassium gluconate, potassium sorbate, potassium malate, potassium hydrogen malate, potassium succinate, potassium hydrogen succinate, potassium citrate, dipotassium hydrogen citrate, potassium dihydrogen citrate, potassium tartrate, potassium hydrogen tartrate, potassium fumarate, potassium hydrogen fumarate, potassium glutamate, potassium aspartate, potassium inosinate, potassium guanylate, potassium uridylate, potassium cytidylate, potassium ribonucleotide, potassium alginate, or the like. Further, the taste improver of the present invention may be used to counter one type of potassium salt, or may be used to counter two or more types of potassium salts. Moreover, the potassium salt may be included as one type or multiple types in the below described food or drink. Since potassium chloride has saltiness relatively near that of table salt, the potassium salt is particularly preferably potassium chloride. The potassium chloride may be commercially marketed potassium chloride or may be bittern including potassium chloride.

No particular limitation is placed on the magnesium salt in the present invention as long as the magnesium salt is edible. Examples include inorganic acid salts, organic acid salts, nucleic acid salts, and amino acid salts. Specific examples of the magnesium salt include magnesium chloride, magnesium sulfate, magnesium glutamate, magnesium oxide, and magnesium carbonate. Further, the taste improver of the present invention may be used to counter one type of magnesium salt, or may be used to counter two or more types of magnesium salts. Moreover, the magnesium salt may be included as one type or multiple types in the below described food or drink. Since magnesium chloride and magnesium sulfate have saltiness relatively near that of table salt, the magnesium salt is particularly preferably magnesium chloride or magnesium sulfate. The magnesium chloride or magnesium sulfate may be commercially marketed or may be magnesium chloride or bittern including magnesium sulfate.

No particular limitation is placed on the calcium salt in the present invention as long as the calcium salt is edible. The calcium salt may be an inorganic acid salt, organic acid salt, nucleic acid salt, or amino acid salt. Specific examples of the utilized calcium salt include: calcium chloride, calcium lactate, calcium monohydrogen phosphate, calcium dihydrogen phosphate, tricalcium phosphate, calcium sulfate, calcium glycerophosphate, calcium sorbate, calcium citrate, calcium gluconate, calcium glutamate, calcium carbonate, calcium ascorbate, calcium alginate, calcium ribonucleotide, or the like. Moreover, the taste improver of the present invention may be used to counter one type of calcium salt or may be used to counter two or more types of calcium salts. Moreover, the calcium salt may be included as one type or multiple types in the below described food or drink. Since calcium chloride and calcium lactate have saltiness relatively near that of table salt, the calcium salt is particularly preferably calcium chloride or calcium lactate. The calcium chloride or calcium lactate may be a commercially marketed product.

No particular limitation is placed on the ammonium salt in the present invention as long as the ammonium salt is edible. Examples include inorganic acid salts, organic acid salts, nucleic acid salts, and amino acid salts. Specific examples of the ammonium salt include: ammonium chloride, ammonium algenate, iron ammonium citrate, ammonium glutamate, ammonium carbonate, ammonium hydrogen carbonate, aluminum ammonium sulfate, ammonium sulfate, diammonium hydrogen phosphate, ammonium dihydrogen phosphate, or the like. Further, the taste improver of the present invention may be used to counter one type of ammonium salt, or may be used to counter two or more types of ammonium salts. Moreover, the ammonium salt may be included as one type or multiple types in the below described food or drink. Since ammonium chloride has saltiness relatively near that of table salt, the ammonium salt is particularly preferably ammonium chloride. The ammonium chloride may be commercially marketed ammonium chloride.

The vegetable extract used in the taste improver of the present invention is obtained by extraction of a vegetable using a suitable solvent. This vegetable extract is characterized as including a vegetable-derived glycoside and/or aglycone of a glycoside. The vegetable including a glycoside may be a fruit vegetable (grain-type vegetable, bean, sprouted vegetable, or fruit-like vegetable type), a root vegetable (potato type), or a stem-type vegetable (stalk vegetable, leafy vegetable, flower vegetable), or a kind of mushroom. Specific examples include paprika, garlic, onion, parsley, purple-fleshed sweet potato, Angelica keiskei, wormwood, mulberry leaves, barley grass, spinach, Corchorus olitorius, kale, green onion, cabbage, *Brassica rapa* var. perviridis, garland *chrysanthemum*, broccoli, celery, asparagus, ginger, Japanese radish, carrot, burdock, green soybean, tomato, Citrus junos, bitter melon, red bell pepper, yam, and sweet potato. Preferred examples include paprika, asparagus, burdock, garlic, tomato, bitter melon, parsley, green soybean, purple-fleshed sweet potato, carrot, garland *chrysanthemum*, spinach, barley grass, Angelica keiskei, mulberry leaves, Japanese radish, onion, Corchorus olitorius, green onion, kale, yam, broccoli, green pepper, and celery. From the standpoint of improvement or decrease of unpleasant flavor, and from the standpoint of no great change of savoriness of the supplemented food or drink, preferred examples are parsley, spinach, broccoli, Corchorus olitorius, mulberry leaves, barley grass, and paprika. The utilized part of each vegetable is preferably the normal edible part of the vegetable.

The term "glycoside" in the present invention refers to a compound formed by glycoside bonding between a saccharide and a non-saccharide compound. The term "aglycone" in the present invention refers to the aforementioned non-saccharide compound. Glycosides are classified according to the aglycone structure as phenol glycosides, coumarin glycosides, flavonoid glycosides, chalcone glycosides, anthocyanidin glycosides, anthraquinone glycosides, indole glycosides, cyano glycosides, steroidal glycosides, and alkaloid glycosides. From the standpoint of taste improvement effect, flavonoid glycosides are preferred. Flavonoid glycosides are further classified as flavone glycoside, flavan glycoside, flavanone glycoside, flavanol glycoside, flavanonol glycoside, flavonol glycoside, isoflavone glycoside, and isoflavanone glycoside. Specific examples of the flavonoid glycoside include apiin, daidzin, hesperidin, neohesperidin, eriocitrin, neoeriocitrin, naringin, narirutin, prunin, didymin, poncirin, astragalin, isoquercitrin, quercitrin, rutin, hyperin, quercimeritrin, myricitrin, glycitin, genistin, callistephin, chrysanthemine, cyanine, keracyanin, idaein, mecocyanine, peonin, delphin, nasunin, petunin, malvin, enin, narirutin, rhoifolin, linaroside, brassidin, and narcissin. From the standpoint of selective improvement or decrease of unpleasant flavor, and from the standpoint of not greatly changing savoriness of the food or drink, flavone glycoside, isoflavanone glycoside, and flavonol glycoside are particularly preferred.

In the present invention, the term "extraction" indicates an operation using a solvent to separate out a solvent soluble component contained in the vegetable, especially a glycoside or aglycone thereof. Any solvent suitable for a foodstuff may be used without particular limitation, as exemplified by water, ethanol, ethyl acetate, propanol, acetone, hexane, or the like. Due to low cost and easy availability, water and/or ethanol are preferred. The form of the vegetable may be raw, flake-like, or powder-like. To simplify the extraction operation, temperature of extraction is preferably from 0 to 100° C., further preferably from 10 to 80° C., and particularly preferably from 40 to 60° C. In order not to denature other food ingredients, pH of extraction is preferably from 2 to 12, and further preferably from 4 to 8. From the standpoint of not greatly changing savoriness of the food or drink, pH of extraction is particularly preferably from 5 to 7. Sodium hydroxide, potassium hydroxide, ammonia water, arginine, lysine, histidine, hydrochloric acid, citric acid, acetic acid, lactic acid, succinic acid, fumaric acid, phosphoric acid, malic acid, glutamic acid, and aspartic acid are cited for adjustment of the pH during extraction. Moreover, a commercial enzyme may be used for increasing efficiency of extraction, or if there is a desire to convert a glycoside into an aglycone, or if there is a desire to make a saccharide adduct. Specific examples of such enzymes include proteases, peptidases, cellulases, hemicellulases, xylanases, mannanases, arabanases, pectinases, glycosidases, β-glycosidases, naringinases, hesperidinases, or the like.

From the standpoint of not greatly changing savoriness and color of the food or drink, per 1 part by weight of the potassium salts, magnesium salts, calcium salts, and ammonium salts, the added amount (solid content basis) of the vegetable extract is preferably from 0.001 to 1 part by weight, and particularly preferably from 0.01 to 0.5 parts by weight.

Apiin has an extremely strong suppression effect with respect to unpleasant flavor. Vegetables that contain apiin are exemplified by parsley, celery, and celery seed. Parsley is a member of the Apiaceae family. Types of parsley include curly leaf parsley (scientific name=*Petroselinum crispum*), flat-leafed Italian parsley (scientific name=Petroselinum neapolitanum), or the like. Either type of parsley can be used for the object of the present invention. Celery is also a plant of the Apiaceae family, and there are various types of improved varieties in addition to the common variety (scientific name=*Apium graveolens* var. dulce). Any type of celery can be used for the object of the present invention. Celery seed is also known to contain apiin, and celery seed can be used as a raw material in the present invention.

Extraction from such vegetables of a component that includes apiin may be used in order to obtain the extract of the present invention. Although any extraction method may be used, extraction using water and/or ethanol is preferred. The raw vegetable may be processed, or alternatively, the vegetable may be dried, freeze dried, or the like. In consideration of efficiency of extraction, the raw material is preferably dried. The edible part of each vegetable is dried to produce the raw material. Drying methods are exemplified by hot air drying, freeze drying, vacuum drying, spray drying, drum drying, or the like; and any of these drying methods may be used. After drying, the raw material may be produced by sterilization processing using superheated steam or the like.

The soluble component is extracted from the dried parsley or the like by adding water and/or ethanol in a 5- to 100-fold amount (weight ratio), preferably 10- to 50-fold amount (weight ratio). The extraction is conducted for 0.5 to 24 hours at a temperature of 0 to 100° C., preferably from 10 to 80° C., and further preferably from 40 to 60° C. An enzyme such as a pectinase and cellulase may be used in order to increase yield of the soluble component. Although the soluble component itself may be used without further processing, it is beneficial to use the soluble component after concentration or drying.

Moreover, it is also possible to concentrate the component by an appended purification process for concentration of the apiin contained within the extract. As shown in the working examples, apiin may be concentrated using a synthetic adsorption agent column (preferably styrene-divinylbenzene type), weakly basic anion exchange resin column, ODS column, or the like.

Moreover, in order to remove color from the vegetable extract according to object of use, processing may be performed such as acid treatment using an organic acid, hydrochloric acid, or the like at a pH 5.0 or less, and preferably pH 3.0 or less. Alternatively, such color removal may be performed by enzyme processing using polyphenol oxidase or peroxidase. In particular, peroxidase treatment may be combined with addition of hydrogen peroxide. Moreover, distillation or a resin (e.g. activated carbon or the like) may be used for removal of odor.

A parsley extract may be obtained that contains from 40 to 80 parts by weight soluble component (solid content basis) from 100 parts by weight of dried parsley raw material.

A suitable solid content based concentration of the taste improver of the present invention in a foodstuff in order to suppress the unpleasant flavor of potassium or the like is 0.001 to 1 percent by weight, and preferably 0.01 to 0.5 percent by weight. As long as potassium or the like is used as a salt substitute in a foodstuff, a fixed range is set according to each foodstuff. Even if the concentration of potassium or the like changes, the taste improver of the present invention has an unpleasant flavor lowering effect when the concentration of the taste improver is 0.01 to 0.5 percent by weight.

If the extract of parsley or the like is further processed for concentration of apiin or the like, the aforementioned added amount may be adjusted according to the degree of concentration of the apiin or the like, and concentration of apiin in the foodstuff is preferably from 10 to 150 ppm.

The below described phospholipid is preferably jointly used in order to further increase the taste improvement effect of the vegetable extract. The effect of the vegetable extract reaches a plateau when concentration of the added vegetable extract becomes a fixed concentration or more, and then further increase of the effect becomes difficult simply by addition of the vegetable extract. The plateaued vegetable extract effect may be further raised by combined use of phospholipid with the vegetable extract. By such combined use, it is possible to add a greater amount of potassium or the like to a foodstuff that contains the vegetable extract and phospholipid. It is thus possible to lower the overall amount of table salt in the foodstuff, and it is possible to increase the salt-reduction effect.

Suitable added amounts of the vegetable extract and phospholipid are from 10:1 to 1:10, expressed as weight ratios.

The phospholipid used in the taste improver of the present invention is obtained from a tissue of a plant, animal, fungus, or the like or from a natural product such as an internal organ or the like by ordinary methods of extraction, separation, and purification. Specifically, soybean, rice, chestnut, beef, chicken, pork, egg yolk, sardine, krill, salmon milt, Alaska Pollack roe, baker's yeast, or the like is extracted, separated, and refined, for example. Furthermore, among phospholipids, phosphatidylcholine, phosphatidylserine, phosphatidylethanolamine, phosphatidylinositol, and the lyso forms thereof are recognized to have a high effect for the selective improvement or reduction of unpleasant flavor. Such phospholipids may be used alone or in combination. Moreover, no particular limitation is placed on the type of fatty acid in the phospholipid structure. Specific examples of the fatty acid include butyric acid, hexanoic acid, octanoic acid, decanoic acid, decenoic acid, lauric acid, myristic acid, myristoleic acid, pentadecanoic acid, pentadecenoic acid, palmitic acid, palmitoleic acid, hexadecatrienoic acid, heptadecanic acid, heptadecenoic acid, heptadecadienoic acid, stearic acid, oleic acid, linoleic acid, linolenic acid, γ-linolenic acid, octadecatetraenoic acid, arachidic acid, icosenoic acid, icosadienoic acid, icosatrienoic acid, icosatetraenoic acid, icosapentaenoic acid, arachidonic acid, behenic acid, docosenoic acid, docosadienoic acid, docosatetraenoic acid, docosapentaenoic acid, docosahexaenoic acid, lignoceric acid, and tetracoseneoic acid. Moreover, the phospholipid in the present invention may be processed by a specific enzyme or may be a hydrogenation product of a phospholipid. Purity of the phospholipid is preferably greater than or equal to 20 percent, further preferably greater than or equal to 50 percent, and particularly preferably greater than or equal to 80 percent. Per 1 part by weight of the potassium salts, magnesium salts, calcium salts, and ammonium salts, the added amount of the phospholipid is preferably from 0.001 to 1 part by weight, and particularly preferably from 0.01 to 0.5 parts by weight, from the standpoints of not greatly changing savoriness, physical properties, and color of the food or drink. The added amount of the phospholipid per 1 part by weight of the vegetable extract is preferably from 0.1 to 10 parts by weight, and particularly preferably from 0.2 to 5 parts by weight.

As shown in the working examples, combined use with the lyso form of the phospholipid has a further synergistic effect. The ratio of phospholipid to lyso-form phospholipid is preferably from 1:3 to 3:1. This ratio is particularly preferably from 1:2 to 2:1.

Moreover, a saccharide may be added to the taste improver of the present invention. From the standpoint of savoriness, the saccharide preferably has a low degree of sweetness. Specific examples include trehalose and hydrogenated starch syrup. From the standpoint of not greatly changing savoriness and physical properties of the food or drink, the added amount of the saccharide per 1 part by weight of the potassium salts, magnesium salts, calcium salts, and ammonium salts is preferably from 0.05 to 10 parts by weight, and particularly preferably is from 0.1 to 2 parts by weight. This added amount per 1 part by weight of the vegetable extract is preferably from 2 to 100 parts by weight, and particularly preferably is from 10 to 50 parts by weight.

Furthermore, arginine may be added to the taste improver of the present invention. The utilized arginine may be a commercially marketed product or may be purified by ordinary methods. Per 1 part by weight of the potassium salts, magnesium salts, calcium salts, and ammonium salts, the added amount of arginine is preferably from 0.02 to 2.5 parts by weight, and particularly preferably from 0.1 to 1.5 parts by weight, from the standpoint of not greatly changing savoriness of the food or drink. Per 1 part by weight of the vegetable extract, the added amount of arginine is preferably from 0.1 to 10 parts by weight, and particularly preferably from 0.2 to 5 parts by weight.

Although the taste improver of the present invention may be used without adjustment of pH, the pH tends to become alkaline after addition of a basic amino acid such as arginine. Thus, pH may be adjusted, and pH is preferably adjusted to weakly acidic to neutral, i.e. a pH value of about 5 to 8. The pH may be adjusted using a suitable inorganic acid, organic acid, or acidic amino acid. From the standpoint of not greatly changing savoriness of the food or drink, pH is preferably adjusted using citric acid, acetic acid, lactic acid, succinic acid, fumaric acid, phosphoric acid, or malic acid. The time of adjustment of pH may be any time up until consumption, and pH adjustment may be performed at the raw material stage, during the manufacturing stage, at the stage after obtaining of the final article, or the like. Since most foodstuffs have a pH in the vicinity of neutral, the taste improver of the present invention may be used without special measures.

The present invention also relates to a method of using the taste improver of the present invention for improvement or reduction of unpleasant flavor resulting from a potassium salt, magnesium salt, calcium salt, or ammonium salt. When the aforementioned taste improver of the present invention is added to a food or drink containing at least a certain amount, i.e. at least 0.1 parts by weight of potassium salt, magnesium salt, calcium salt, or ammonium salt per 1 part by weight of sodium salt in the foodstuff, it is possible to improve that unpleasant flavor that had resulted from the potassium salt, magnesium salt, calcium salt, or ammonium salt in the foodstuff. Although the target of addition will vary according to the supplemented foodstuff, the added amount of the vegetable extract relative to the entire food or drink is 0.001 to 1 percent by weight, and preferably from 0.01 to 0.5 percent by weight from the standpoint of not greatly changing savoriness, color, and physical properties of the food or drink. Similarly the added amount of phospholipid is 0.001 to 1 percent by weight, and preferably from 0.01 to 0.5 percent by weight. Similarly the added amount of arginine is 0.05 to 10 percent by weight, and added amount of the saccharide is 0.1 to 10 percent by weight. Improvement of unpleasant flavor of the food or drink becomes possible by addition of the taste improver of the present invention in this manner.

If the taste improver is used with the goal of lowering of salt content, although the effect of a single component is limited, salt content reduction may be further enhanced by the combination of multiple components.

In an example blend of the taste improver, per 1 part by weight of vegetable extract, the phospholipid content is from 0.2 to 5 parts by weight, the saccharide content is from 2 to 100 parts by weight, and/or the arginine content is from 0.1 to 10 parts by weight. Preferably, at least 2 of these components are blended, and most preferably all 3 of these components are blended. In a specific example, a formulation or the like is blended using (solid content basis) parsley extract:soybean-derived phospholipid:arginine: trehalose at ratios of about 1:1:4:20.

Moreover, the taste improver of the present invention obtained in this manner may be added to various types of foods or drinks where part of sodium salt has been substituted by a potassium salt, magnesium salt, calcium salt, or ammonium salt with the object of decreasing salt (i.e. decreasing the amount of sodium), thereby producing a food or drink of reduced salt content and free of unpleasant flavor. Since the taste improver of the present invention itself does not have a special flavor so as to greatly limit use in the foodstuff, the taste improver of the present invention may be used in a wide range of foods-beverages. These food or drink include processed seafoods such as salmon flakes, karashimentaiko (salted cod roe seasoned with salt and hot red pepper), salted cod roe, grilled fish, dried fish, salted fish products, fish sausage, boiled fish, fish boiled in soy sauce and canned foods, snacks such as potato chips, rice crackers or cookies, noodle soups such as udon (thick wheat flour noodle) soups, soba (buckwheat noodle) soups, somen (Japanese vermicelli) soups, ramen (Chinese noodle) soups, chanpon (mixed Chinese noodle) soups and pasta sauces, rice-based foods such as rice balls, pilaf, fried rice, mixed boiled rice, porridge of rice and vegetables and boiled rice with tea, prepared foods such as spring rolls, steamed dumplings, Chinese-style dumplings, curries, stews and fried foods, processed meat products such as hamburgers, sausages, hams and cheeses, processed vegetable products such as kimchi (pickled cabbage) or Japanese pickles, seasonings such as soy sauce, sauces, dressings, miso (fermented bean paste), mayonnaise and tomato ketchup and soups such as consommé soups, clear soups, miso soup and potage soups.

The taste improver of the present invention may be used in combination with various types of other known and marketed additives for reduction of salt content.

Working examples for concrete explanation of the present invention are described below. However, the present invention is not limited by these working examples.

Within the working examples, unless specifically noted otherwise, "%" refers to "wt. %".

Data Analysis and Analytical Methods Used in the Working Examples (1) Measurement of Sodium Chloride Content and Potassium Chloride Content The measurements of sodium chloride content and potassium chloride content were performed in the following manner. That is to say, 1 percent HCl was added to a roughly 5 g sample to obtain a dilute solution of 100 g total weight. The solution was shaken for 30 minutes to extract sodium ions and potassium ions. Thereafter, the extract sample was diluted using a desired amount of 1 percent HCl, and then sodium content and potassium content were measured using an atomic absorption spectrophotometer (model Z-2000, manufactured by Hitachi High Technologies Corp.). Based on the molecular weight of sodium chloride, the obtained sodium content was multiplied by 2.54 to calculate the sodium chloride content. Similarly, the potassium chloride content was calculated by multiplying the potassium content by 1.91.

(2) Preparation of Standard Solution for Potassium Chloride Unpleasant Flavor Improvement Effect Evaluation 1.32 g of Chinese soup stock granules (product name="Marudori-gara Soup", manufactured by Ajinomoto K.K., standard nutritional ingredients of 2.5 g of Chinese soup stock granules are shown in Table 1) was dissolved in 70 g of distilled water, and the mixture was filtered through filter paper (filter paper no. 2, manufactured by Advantec Toyo K.K.). Thereafter, 0.63 g of NaCl was added, and water was further added to obtain 100 g of chicken stock soup containing an equivalent of 1.26 percent table salt (Table 2, standard solution 1). The concentration of sodium chloride was decreased in a stepwise manner from the composition of the standard solution 1, and potassium chloride was added to produce multiple chicken stock soups (Table 2, standard solutions 2 to 8). The ratio of potassium chloride to sodium chloride ((potassium chloride concentration/sodium chloride concentration)×100(%), referred to hereinafter as "K/Na ratio") was changed in standard solutions 1 to 8, and the intensity of the unpleasant flavor (i.e. bitterness, astringent taste, harsh taste, and bitter taste) characteristic of potassium chloride increased as the K/Na ratio value increased. The unpleasant flavor intensity increased in a stepwise manner for standard solutions 1 to 8. Intensity of this unpleasant flavor and detailed taste were evaluated by organoleptic evaluation by an expert panel, and results of evaluation were classified in three stages, i.e. initial taste, middle taste, and aftertaste. These results are shown in Table 3.

TABLE 1

| Caloric content | 4.7 kcal | Carbohydrate | 0.69 g |
| Protein | 0.41 g | Sodium | 470 mg |
| Lipids | 0.04 g | Equivalents of table salt | 1.2 g |

TABLE 2

| | (unit: wt. %) | | | | | | | |
| --- | --- | --- | --- | --- | --- | --- | --- | --- |
| | Standard solution | | | | | | | |
| | 1 | 2 | 3 | 4 | 5 | 6 | 7 | 8 |
| Chinese soup stock granules | 1.32 | 1.32 | 1.32 | 1.32 | 1.32 | 1.32 | 1.32 | 1.32 |
| NaCl | 0.63 | 0.57 | 0.51 | 0.44 | 0.38 | 0.32 | 0.25 | 0.19 |
| KCl | 0.00 | 0.13 | 0.25 | 0.38 | 0.50 | 0.63 | 0.76 | 0.88 |
| Water | 98.05 | 97.99 | 97.93 | 97.86 | 97.80 | 97.74 | 97.67 | 97.61 |
| Total | 100.00 | 100.00 | 100.00 | 100.00 | 100.00 | 100.00 | 100.00 | 100.00 |
| Actual measured NaCl value (%) | 1.26 | 1.20 | 1.14 | 1.07 | 1.01 | 0.95 | 0.89 | 0.82 |
| Actual measured KCl value (%) | 0.07 | 0.20 | 0.32 | 0.45 | 0.58 | 0.70 | 0.83 | 0.95 |
| KCl/NaCl (%) | 5.71 | 16.51 | 28.51 | 41.91 | 56.98 | 74.06 | 93.57 | 116.07 |

TABLE 3

| Standard solution | Unpleasant flavor intensity | NaCl (%) | KCl (%) | Details of unpleasant flavor |
|---|---|---|---|---|
| Standard solution 1 | 0 | 1.26 | 0.07 | Saltiness was sensed only in the initial taste. |
| Standard solution 2 | 1 | 1.20 | 0.20 | Saltiness was sensed from the initial taste to the middle taste. |
| Standard solution 3 | 2 | 1.14 | 0.32 | Saltiness was maintained from the initial taste until the aftertaste. |
| Standard solution 4 | 3 | 1.07 | 0.45 | Saltiness accompanied by numbness was maintained from the initial taste to the aftertaste. |
| Standard solution 5 | 4 | 1.01 | 0.58 | Saltiness was sensed from the initial taste to the middle taste, and bitterness remained for a while in the aftertaste. |
| Standard solution 6 | 5 | 0.95 | 0.70 | Saltiness was sensed from the initial taste to the middle taste, and tongue-numbing bitterness was sensed in the aftertaste. |
| Standard solution 7 | 6 | 0.89 | 0.83 | Sharp bitter taste was sensed from the initial taste to the middle taste, and bitterness and harsh taste were sensed in the aftertaste. |
| Standard solution 8 | 7 | 0.82 | 0.95 | Tongue-irritating bitter taste was sensed from the initial taste to the middle taste, and bitterness, harsh taste, and astringent taste were sensed in the aftertaste. |

(3) Method for Checking Improvement Effect for the Unpleasant Flavor of Potassium Chloride (Referred to Hereinafter as Evaluation Method 1)

Sample evaluation solutions were prepared with sodium chloride and potassium chloride concentration values equivalent to the actual measured value of the standard solution 8 and containing a respective desired concentration of the test sample. While test solution sample names were concealed, the produced sample evaluation solutions (maximum of 6 types) and the standard solution 1 and standard solution 8 of Table 2 were evaluated for unpleasant flavor intensity of potassium chloride by an expert panel (n=8), and the tested solutions were ranked. The normalized rank method was used to convert theordinal scale obtained by ranking to a distance scale (normalized score). Taking the factors to be the samples and panel, these scores were analyzed for two-dimensional analysis of variance, and significance was tested. When significance was found, t distribution was further used to find the least significant difference (abbreviated below as l.s.d.) and test for significance. Which samples had significant differences between one another was checked.

Indication of Results: Within the figures, the values written on the vertical axis or for each sample indicate the respective sample distance scale (normalized score). When the difference in normalized score between two different samples is greater than the l.s.d. value (number written to the upper right in the figure), there is a significant difference between the two samples ($p<0.05$), i.e. this means the results for the two samples were separated enough so that there could have been no mistaken mis-ranking of order between the two samples.

(4) Method of Quantitating Effect of Improvement of Unpleasant Flavor of Potassium Chloride (Referred to Below as Evaluation Method 2)

A desired concentration of test solution was added to one of the standard solutions of Table 2 to produce an evaluation solution. At this time, for a test sample containing sodium chloride or potassium chloride, the evaluation solution was adjusted such that the total sodium chloride concentration or total potassium chloride concentration of the evaluation solution was equivalent to the respective standard solution. The standard solutions 1 to 8 of Table 2 are indicated in order of potassium chloride concentration. These evaluation solutions were compared to the standard solution, and the corresponding unpleasant flavor of potassium chloride was expressed as a K/Na ratio. The improvement effect was indicated as higher as the ratio of K/Na ratio obtained by evaluation to actual K/Na ratio decreased.

Working Example 1

Effect of Vegetable Extract for Improvement of Unpleasant Flavor of Potassium Chloride
(1) Production of Vegetable Extract Distilled water was added to a respective 5 g sample of one of the 30 varieties of dried vegetable powder (i.e. paprika, garlic, onion (the above being produced by S & B Foods, Inc.); parsley, purple-fleshed sweet potato, Angelica keiskei, wormwood, mulberry leaves, barley grass, spinach, Corchorus olitorius, kale, green onion, cabbage, *Brassica rapa* var. perviridis, garland *chrysanthemum*, broccoli, celery, asparagus, ginger, Japanese radish, carrot, burdock, green soybean, tomato, *Citrus junos*, bitter melon, red bell pepper, yam, sweet potato (the above being produced by Kodama Foods Co., Ltd., each sample being the entire dried edible part of the vegetable)) to obtain a 200 g mixture, and then the mixture was heated in a water bath at 30° C. for 2 hours. Thereafter, the respective mixture was centrifuged (7,000 rpm for 15 minutes) and then was filtered through filter paper (no. 2 filter paper, manufactured by Advantec Toyo K.K.). The obtained respective filtered solution was concentrated and dried under vacuum to obtain solids. Then, distilled water was added to produce a respective vegetable extract solution that had 10 percent solids content. The yield of extract solids is shown in Table 4.

TABLE 4

| Sample no. | Test sample Name | Yield (%) |
|---|---|---|
| 1 | Paprika | 59.26 |
| 2 | Garlic | 90.71 |
| 3 | Onion | 84.93 |
| 4 | Parsley | 45.64 |
| 5 | Purple-fleshed sweet potato | 24.80 |
| 6 | Angelica keiskei | 35.91 |
| 7 | Wormwood | 21.40 |
| 8 | Mulberry leaves | 30.46 |
| 9 | Barley grass | 25.04 |
| 10 | Spinach | 48.05 |
| 11 | Corchorus olitorius | 22.62 |
| 12 | Kale | 22.66 |
| 13 | Green onion | 53.27 |
| 14 | Cabbage | 84.05 |
| 15 | Brassica rapa var. perviridis | 61.22 |
| 16 | Garland chrysanthemum | 56.97 |
| 17 | Broccoli | 54.28 |
| 18 | Celery | 23.42 |
| 19 | Asparagus | 84.67 |
| 20 | Ginger | 9.73 |
| 21 | Japanese radish | 70.33 |
| 22 | Carrot | 69.69 |
| 23 | Burdock | 79.18 |
| 24 | Green soybean | 16.42 |
| 25 | Tomato | 87.31 |
| 26 | Citrus junos | 74.46 |
| 27 | Bitter melon | 42.47 |
| 28 | Red bell pepper | 73.33 |
| 29 | Yam | 11.75 |
| 30 | Sweet potato | 30.41 |

(2) Effect of Vegetable Extract for Improvement of Unpleasant Flavor of Potassium Chloride For each of the types of vegetable extract solutions of Table 4, the respective vegetable extract solution was added to the standard solution 8 to obtain a solids content of 0.1 percent (final concentration) and to produce an evaluation solution. The evaluation solution was evaluated by the evaluation method 1. The distance scale for each of the samples as a result of this evaluation is shown in FIG. 1 to FIG. 8. Distance scale is plotted along the vertical axis, and each measured sample is indicated along the horizontal axis. The value of l.s.d. is indicated in the upper right part of the figure for the present measurements.

Figure 9:
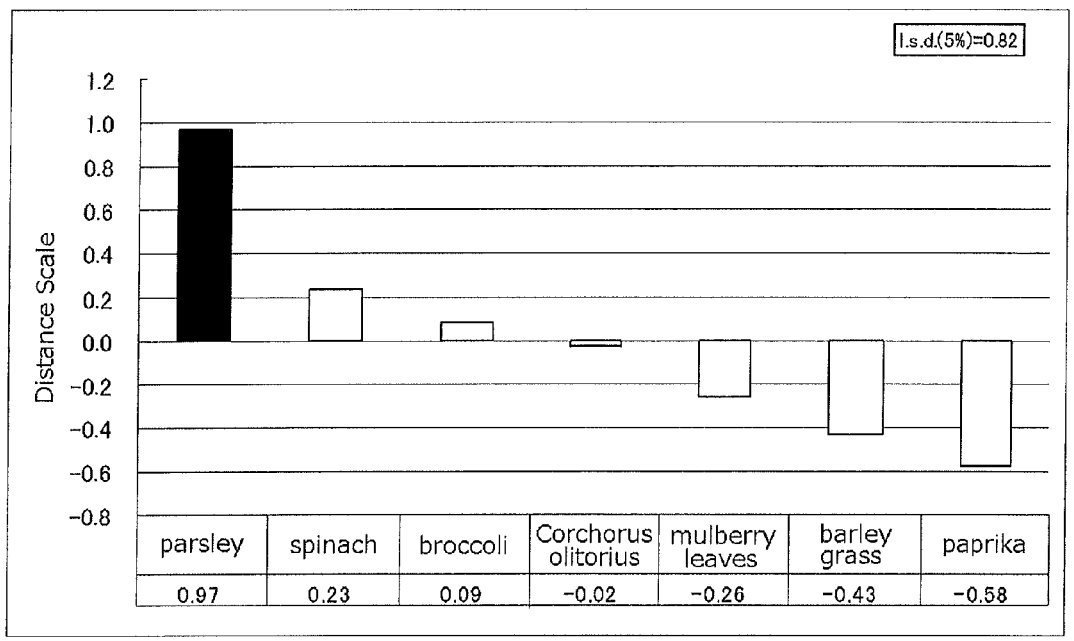
FIG. 9 shows the potassium chloride taste improvement effect of extracts of paprika, parsley, mulberry leaves, barley grass, spinach, Corchorus olitorius, and broccoli in Working Example 1.

As a result, materials that lowered the unpleasant flavor intensity of potassium chloride of the standard solution 8 were found to be asparagus, burdock, garlic, tomato, bitter melon, parsley, green soybean, purple-fleshed sweet potato, paprika, carrot, garland chrysanthemum, spinach, barley grass, Angelica keiskei, mulberry leaves, Japanese radish, onion, Corchorus olitorius, green onions, kale, yam, broccoli, green pepper, and celery. Among these materials, the materials found to have the highest unpleasant flavor improvement effect were paprika, parsley, mulberry leaves, barley grass, spinach, Corchorus olitorius, and broccoli. Moreover, when the improvement effects of these 7 types of materials were compared, as shown in FIG. 9, the improvement effect of parsley was found to be highest.

Working Example 2

(1) Parsley Extract Concentration and the Effect of Improvement of Unpleasant Flavor of Potassium Chloride The aforementioned parsley extract solution was added to obtain final concentrations of 0.025, 0.050, 0.075, 0.10, and 0.125 percent, and evaluations were performed by the evaluation method 1. The distance scale of each of the samples (i.e. result of evaluation) is plotted in FIG. 10.

Figure 10:
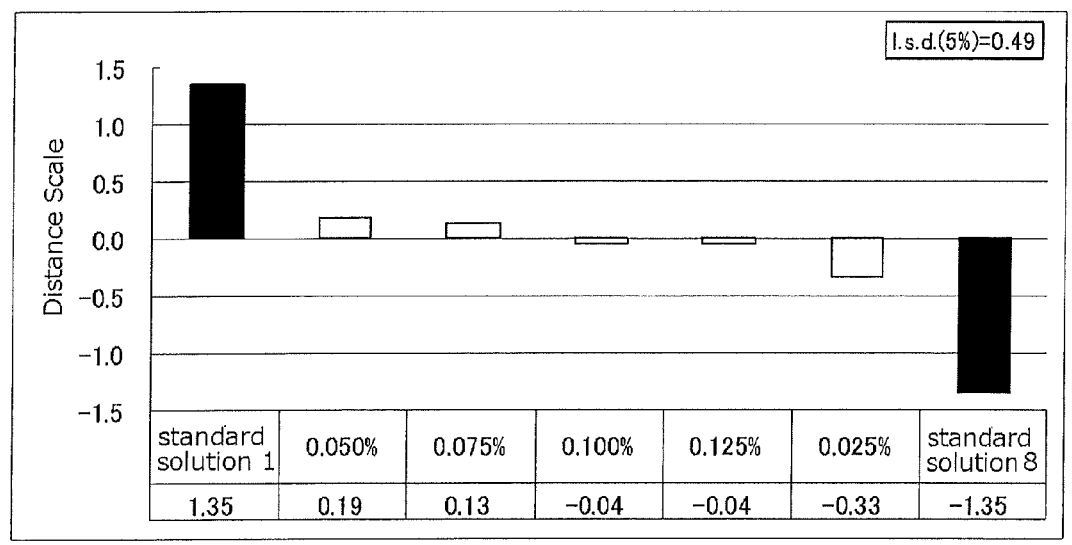
FIG. 10 shows the potassium chloride taste improvement effect and the added amount of the parsley extract in Working Example 2.

As shown in FIG. 10, a potassium chloride unpleasant flavor improvement effect was found for each of the concentrations from 0.025 to 0.125 percent. At concentrations greater than or equal to 0.05 percent, a tendency was not seen for the potassium chloride unpleasant flavor improvement effect to increase in a concentration-dependent manner.

(2) Quantitative Measurement of Effect of Parsley Extract in Improvement of Unpleasant Flavor of Potassium Chloride The aforementioned parsley extract solution was added to the standard solutions 4, 6, and 8 to obtain final concentrations of 0.05 percent, and evaluations were performed by the evaluation method 2. The distance scale of each of the samples (i.e. result of evaluation) is plotted in FIG. 11.

Figure 11:
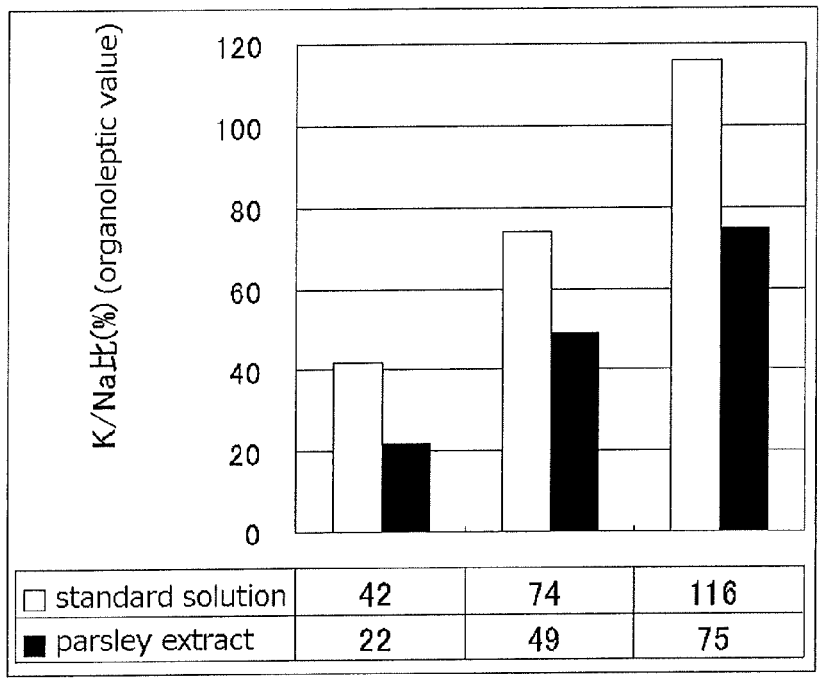
FIG. 11 shows the quantitative measurement of the effect of parsley extract in improvement of unpleasant flavor of potassium chloride in Working Example 2.

As shown in FIG. 11, the strong unpleasant flavor due to potassium chloride at the 116 percent K/Na ratio level was found to be improved to that of 75 percent, the 74 percent K/Na ratio level was found to be improved to that of 49 percent, and the 42 percent K/Na ratio level was found to be improved to that of 22 percent.

Working Example 3

Identification within Parsley Extract of Component for Improvement of Unpleasant Flavor of Potassium Chloride The parsley extract obtained in Working Example 1 was fractionated sequentially by the below listed processing (1) to (4), and the component for improvement of the unpleasant flavor of potassium chloride was specified using the maintenance of a potassium chloride unpleasant flavor improvement effect as an indicator.

(1) Synthetic Adsorption Agent Column Processing 100 g of a 1 percent by weight aqueous solution of the parsley extract obtained in Working Example 1 was charged to a column (50 mL) loaded with synthetic adsorption agent (HP-20, produced by Mitsubishi Chemical Corp.), and the column was eluted in turn using 20 column volumes of distilled water, 15 volume percent ethanol in water solution, 50 volume percent ethanol in water solution, and ethanol. The obtained eluates were evaporated to form solids under vacuum to obtain the fractions 2 to 5. The obtained yields of dried material are shown in Table 5. Distilled water was added to the dried material to obtain a 100 g mixture, and the mixture was sufficiently dissolved to obtain aqueous solutions of the fractions 2 to 5. A 1 percent by weight aqueous solution of the parsley extract and aqueous solutions of fractions 2 to 5 were added to the standard solution 8 to result in 15 percent by weight concentration and obtain evaluation solutions 1 to 5, respectively. Evaluations were performed by the evaluation method 1.

TABLE 5

| | Yield (mg) |
|---|---|
| Parsley extract | 1000.0 |
| Fraction 2 | 782.6 |
| Fraction 3 | 55.2 |
| Fraction 4 | 119.3 |
| Fraction 5 | 1.1 |

Figure 12:
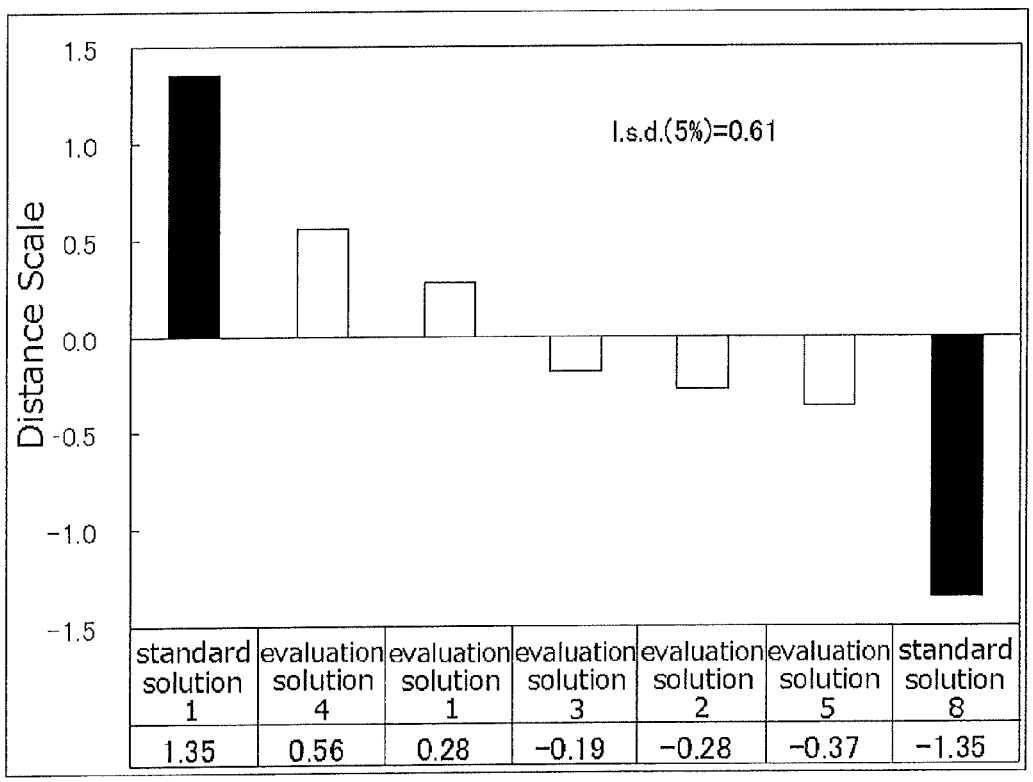
FIG. 12 shows the taste improvement effect of components fractionated by treatment using a synthetic adsorption agent in Working Example 3.

The distance scale of each of the samples (i.e. result of evaluation) is plotted in FIG. 12. As shown in FIG. 12, the evaluation solution 4 (eluate obtained using 50 volume percent ethanol in water solution) fractionated by the synthetic adsorption agent column processing was found to have an unpleasant flavor improvement effect equivalent to that of the evaluation solution 1 (i.e. parsley extract aqueous solution), and the taste improvement fraction was isolated.

(2) Weakly Basic Anion Exchange Resin Column Treatment 100 g of the fraction 4 aqueous solution obtained in section (1) was charged to a column (50 mL) loaded with weakly basic anion exchange resin (WA-30, produced by Mitsubishi Chemical Corp.), and the column was eluted in turn using 20 column volumes of 25 volume percent ethanol in water solution, 50 volume percent ethanol in water solution, and ethanol. The obtained eluate solutions were evaporated to form solids under vacuum, and fractions 6 to 8 were obtained. The yields of the obtained dried materials are shown in Table 6. 100 g of distilled water was added to the dried material, and the material was sufficiently dissolved to obtain fraction 6 to 8 aqueous solutions. The fraction 6 to 8 aqueous solutions were added to the standard solution 8 to obtain a concentration of 15 percent by weight and obtain evaluation solutions 6 to 8, respectively. Evaluation was performed by the evaluation method 1.

TABLE 6

|  | Yield (mg) |
| --- | --- |
| Fraction 4 | 119.3 |
| Fraction 6 | 15.2 |
| Fraction 7 | 60.4 |
| Fraction 8 | 3.9 |

Figure 13:
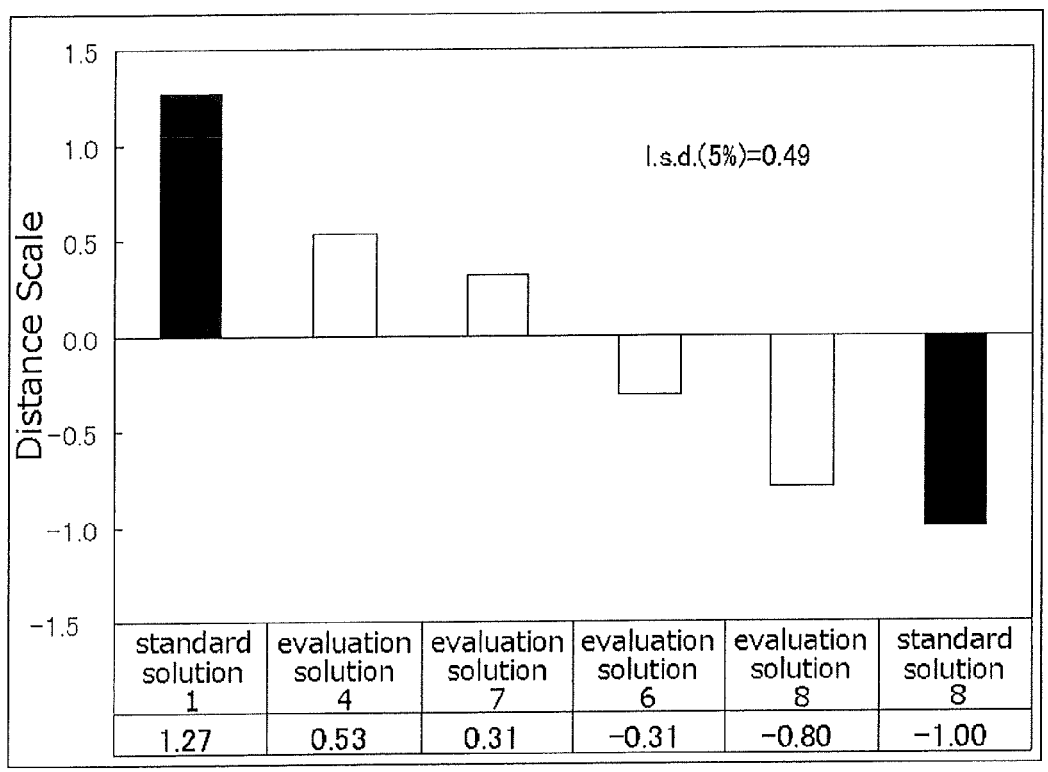
FIG. 13 shows the taste improvement effect of components fractionated by treatment using a weakly basic anion exchange resin column in Working Example 3.

The distance scale of each of the samples (i.e. result of evaluation) is plotted in FIG. 13. As shown in FIG. 13, the evaluation solution 7 containing the fraction fractionated by the weakly basic anion exchange resin column treatment (eluate using 50 volume percent ethanol in water solution) was found to have an improvement effect for unpleasant flavor equivalent to that of the evaluation solution 4, and the taste improvement fraction was isolated.

(3) ODS Column Treatment 100 g of the fraction 7 aqueous solution obtained in section (2) was evaporated to form solids, the solids were dissolved in 1 mL of 20 volume percent ethanol in water solution, and the resultant sample was charged to a column (25 mL) loaded with ODS (Cosmosil 75 C18-OPN, manufactured by Nacalai Tesque, Inc.), and then the column was eluted in turn using 20 column volumes of 20 volume percent ethanol in water solution, 50 volume percent ethanol in water solution, and ethanol. The obtained eluate solutions were evaporated under vacuum to obtain solids as the fractions 9 to 11. Yields of the obtained dried materials are shown in Table 7. The dried material was added to distilled water to obtain a 100 g mixture, and the dried material was sufficiently dissolved to obtain the fractions 9 to 11 aqueous solutions. Each of the fraction 9 to 11 aqueous solutions was added to the standard solution 8 to obtain a concentration of 15 percent by weight and obtain evaluation solutions 9 to 11, respectively. Evaluation was performed by the evaluation method 1.

TABLE 7

|  | Yield (mg) |
| --- | --- |
| Fraction 7 | 60.4 |
| Fraction 9 | 50.4 |
| Fraction 10 | 2.8 |
| Fraction 11 | 2.5 |

Figure 14:
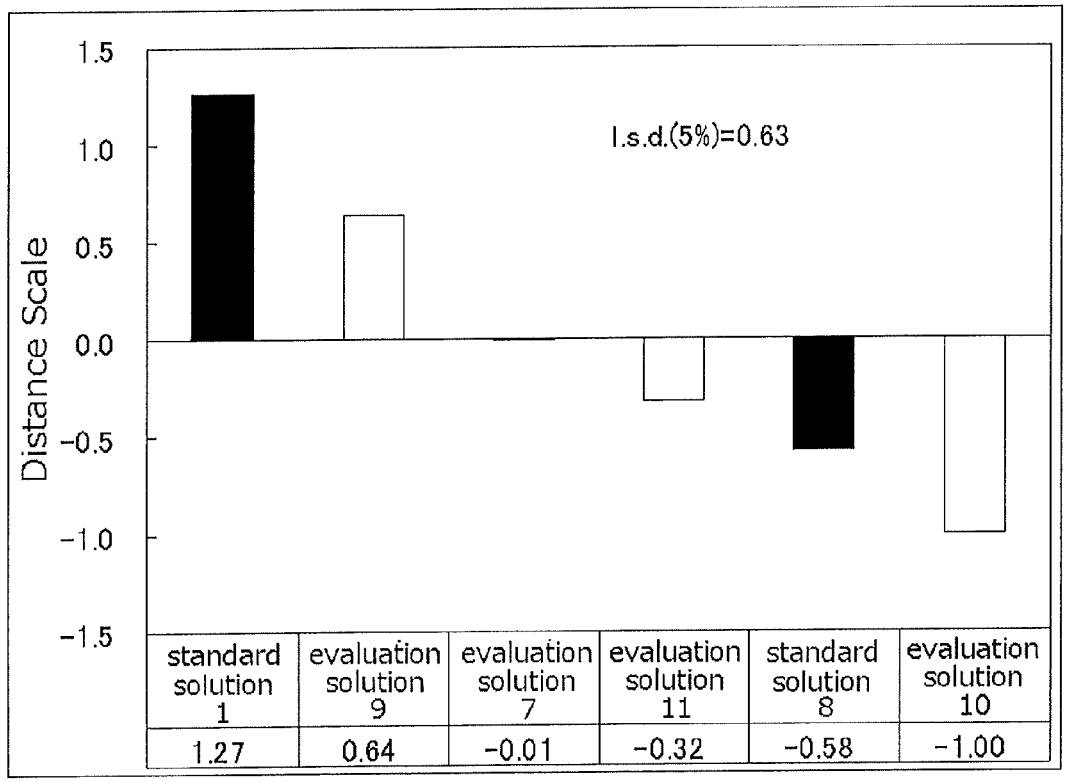
FIG. 14 shows the taste improvement effect of components fractionated by treatment using an ODS column (25 mL) in Working Example 3.

The distance scale of each of the samples (i.e. result of evaluation) is plotted in FIG. 14. As shown in FIG. 14, the evaluation solution 9 containing the fraction fractionated by ODS column treatment was found to have an improvement effect for unpleasant flavor equivalent to that of the evaluation solution 7, and the taste improvement fraction was isolated.

(4) ODS Column Treatment 100 g of the fraction 9 aqueous solution obtained in section (3) was evaporated to form solids, the solids were dissolved in 1 mL of 20 volume percent ethanol in water solution, and the resultant sample was charged to a column (75 mL) loaded with ODS (Cosmosil 75 C18-OPN, manufactured by Nacalai Tesque, Inc.), and then the column was eluted in turn using 5 column volumes of 20 volume percent ethanol in water solution, 15 column volumes of 20 volume percent ethanol in water solution, and 20 column volumes of 50 volume percent ethanol in water solution. The obtained eluate solutions were evaporated under vacuum to obtain solids as the fractions 12 to 14. Yields of the obtained dried materials are shown in Table 8. The dried material was added to distilled water to obtain a 100 g mixture, and the dried material was sufficiently dissolved to obtain the fraction 12 to 14 aqueous solutions. Each of the fraction 12 to 14 aqueous solutions was added to the standard solution 8 to obtain a concentration of 15 percent by weight and obtain evaluation solutions 12 to 14, respectively. Evaluation was performed by the evaluation method

TABLE 8

|  | Yield (mg) |
| --- | --- |
| Fraction 9 | 50.4 |
| Fraction 12 | 8.6 |
| Fraction 13 | 25.7 |
| Fraction 14 | 4.3 |

Figure 15:
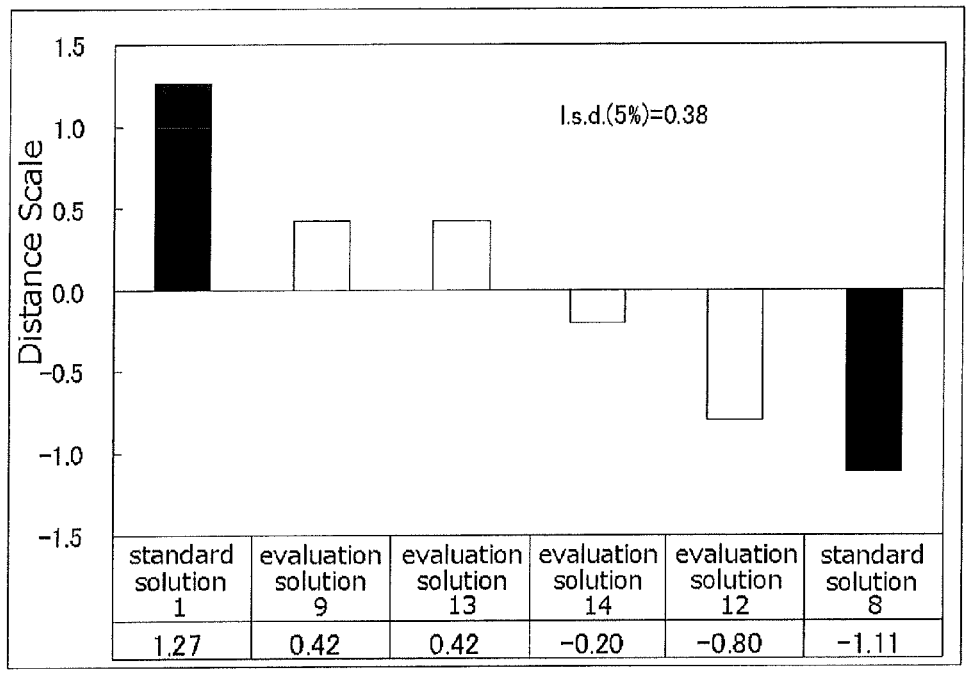
FIG. 15 shows the taste improvement effect of components fractionated by treatment using an ODS column (75 mL) in Working Example 3.

The distance scale of each of the samples (i.e. result of evaluation) is plotted in FIG. 15. As shown in FIG. 15, the evaluation solution 13 containing the fraction fractionated by ODS column treatment was found to have an improvement effect for unpleasant flavor equivalent to that of the evaluation solution 9, and the taste improvement fraction was isolated.

(5) Analysis of the Active Component

As a result of measurement and analysis of proton and carbon 13 nuclear magnetic resonance spectroscopy of the aforementioned fraction 13, the substance included in parsley extract that improved unpleasant flavor of potassium chloride was found to be apiin, which is a glycoside where the apioglucoside is bonded at the position 7 of apigenin.

(6) Potassium Chloride Taste Improvement Effect of the Aforementioned Fraction 13

Figure 16:
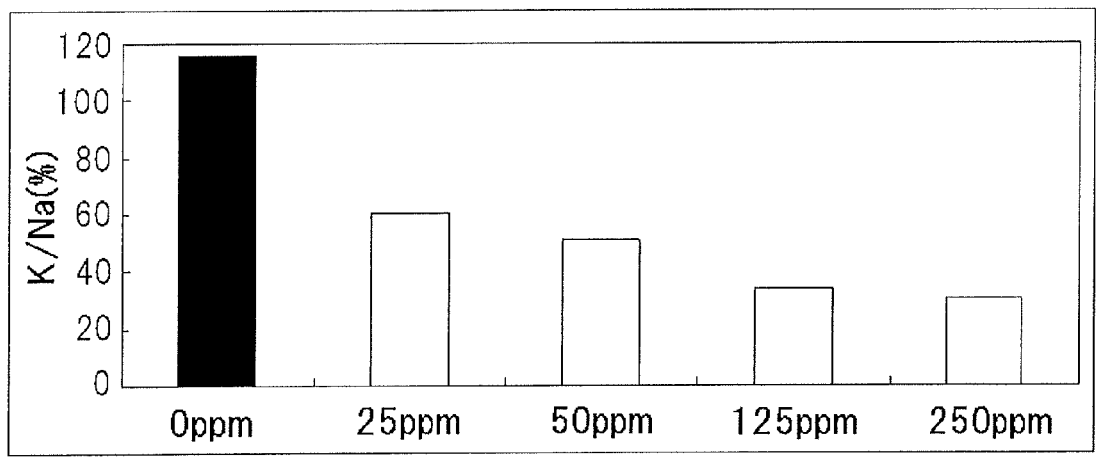
FIG. 16 shows the potassium chloride taste improvement effect and the added amount of the fraction 13 in Working Example 3.

Sample solutions were produced by addition of the aforementioned fraction 13 to the standard solution 8 at concentrations of 25, 50, 125, and 250 ppm, and the potassium chloride unpleasant flavor improvement effect was evaluated. Evaluation was performed by the evaluation method 2. The K/Na (percent) ratio corresponding to each test sample solution is shown in FIG. 16. As shown in FIG. 16, the unpleasant flavor improvement effect increases as the added amount of the fraction 13 increased, and a near maximum was reached at 125 ppm or greater.

Working Example 4

Comparison of Effects of Various Types of Glycoside and Aglycone for Improvement of Unpleasant Flavor of Potassium Chloride As shown in Table 9, the Working Example 3 fraction 13 (apiin fraction) as well as 14 other types of glycosides and aglycones of such of at least 95 percent purity were used to prepare respective evaluation solutions by addition to standard solution 8 to obtain a final concentration of 25 ppm. The improvement effect against the unpleasant flavor of potassium chloride was evaluated by evaluation method 2.

TABLE 9

| Sample no. | Type | Aglycone/Glycoside | Test sample name. |
|---|---|---|---|
| Working Example 3 - Fraction 13 | Flavone | Glycoside | Apiin |
| 1 | | Aglycone | Apigenin |
| 2 | | Glycoside | Apigenin 7-glucoside |
| 3 | Flavonol | Glycoside | Rutin |
| 4 | | Aglycone | Quercetin |
| 5 | | Glycoside | Quercetin 3-β-D-glucoside |
| 6 | | Glycoside | Glycitin |
| 7 | Isoflavone | Aglycone | Daidzein |
| 8 | | Glycoside | Daidzin |
| 9 | Flavanone | Glycoside | Naringin |
| 10 | | Glycoside | Hesperidin |
| 11 | Phenol | Glycoside | Phloretin |
| 12 | | Glycoside | α-arbutin |
| 13 | Coumarin | Glycoside | Esculin |
| 14 | Indole | Glycoside | Indican |

Figure 17:
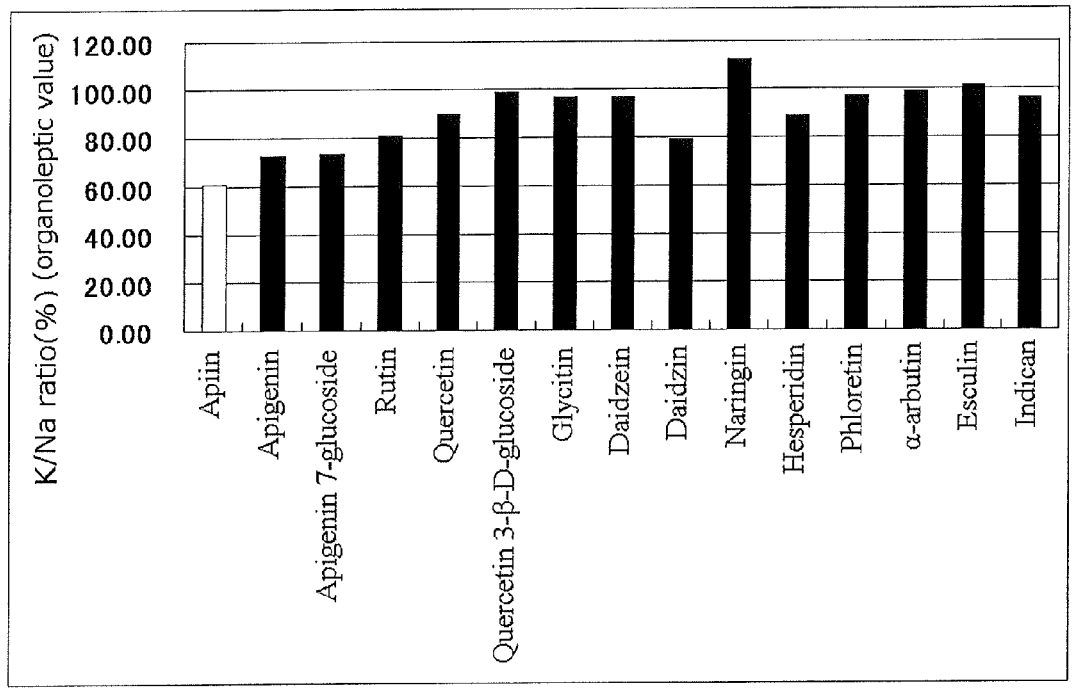
FIG. 17 shows the potassium chloride taste improvement effect of various types of glycosides and aglycones in Working Example 4.

As shown in FIG. 17, in comparison to the other 14 types of glycosides and aglycones, the apiin of fraction 13 of Working Example 3 had a particularly high effect. Moreover, apigenin (an aglycone of apiin) and apigenin 7-glucoside (analog of apiin) were found to have a high effect. In addition, rutin (a flavonol glycoside) and daidzin (an isoflavone glycoside) were found to also have a high effect. On the other hand, an improvement effect was not found for naringin (a flavanone glycoside).

Working Example 5

Method of Production of Parsley Extract
(1) Extraction Temperature

Figure 18:
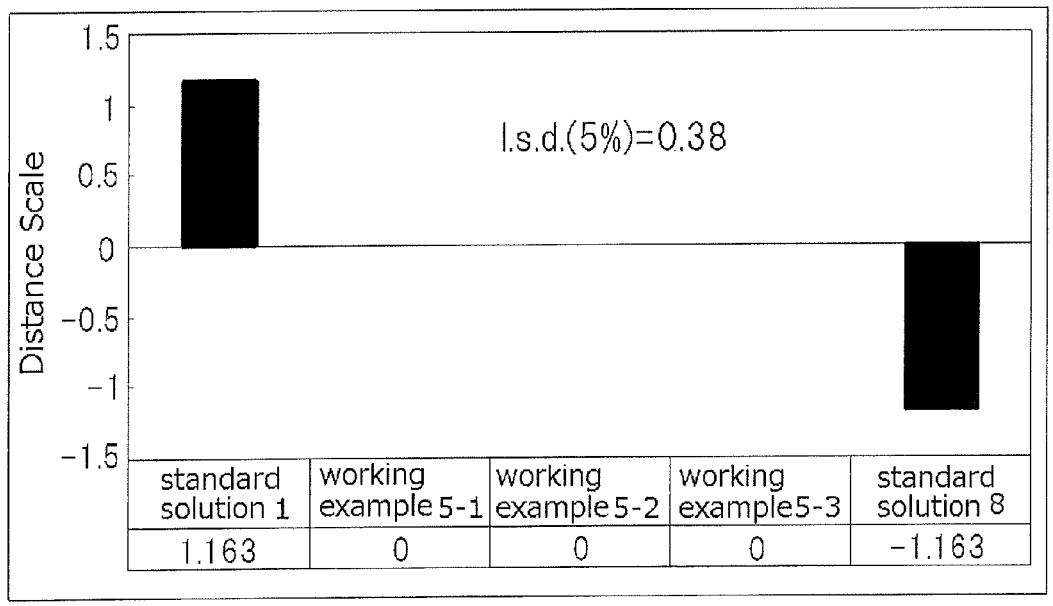
FIG. 18 shows the potassium chloride taste improvement effect of parsley extracts of different extraction temperatures in Working Example 5.

Distilled water was added to 5 g of parsley dried powder to produce a 200 g mixture. Then, the mixture was thermally extracted for 2 hours in a water bath at 30, 60, or 80° C. The mixture was then centrifuged and filtered through filter paper. The obtained filtrate solution was evaporated in vacuum to obtain solids as the extract powders 5-1 to 5-3, respectively. Yields of the obtained extract powders are shown in Table 10. Each extract powder was added to standard solution 8 to reach a final concentration of 0.1 percent by weight to obtain working example samples 5-1 to 5-3, respectively. Evaluations were performed by the evaluation method 1. The distance scale of each of the samples is shown in FIG. 18. As shown in FIG. 18, no differences were found in the improvement effect according to extraction temperature.

TABLE 10

| | Yield (g) |
|---|---|
| Extract powder 5-1 | 1.90 |
| Extract powder 5-2 | 1.90 |
| Extract powder 5-3 | 1.50 |

(2) Extract Ethanol Concentration 200 mL of 20 volume percent ethanol in water solution, 50 volume percent ethanol water, or 80 volume percent ethanol in water solution was added to 5 g of parsley dried powder, and the mixture was thermally extracted for 2 hours in a water bath at 30° C. The mixture was then centrifuged and filtered through filter paper. The obtained filtrate solution was evaporated under vacuum to obtain solids as the extract powders 5-4 to 5-6, respectively. Yields of the obtained extract powders are shown in Table 11. The extract powder was added to standard solution 8 to reach a final concentration of 0.1 percent by weight and obtain working example samples 5-4 to 5-6, respectively. Evaluations were performed by the evaluation method 1.

Figure 19:
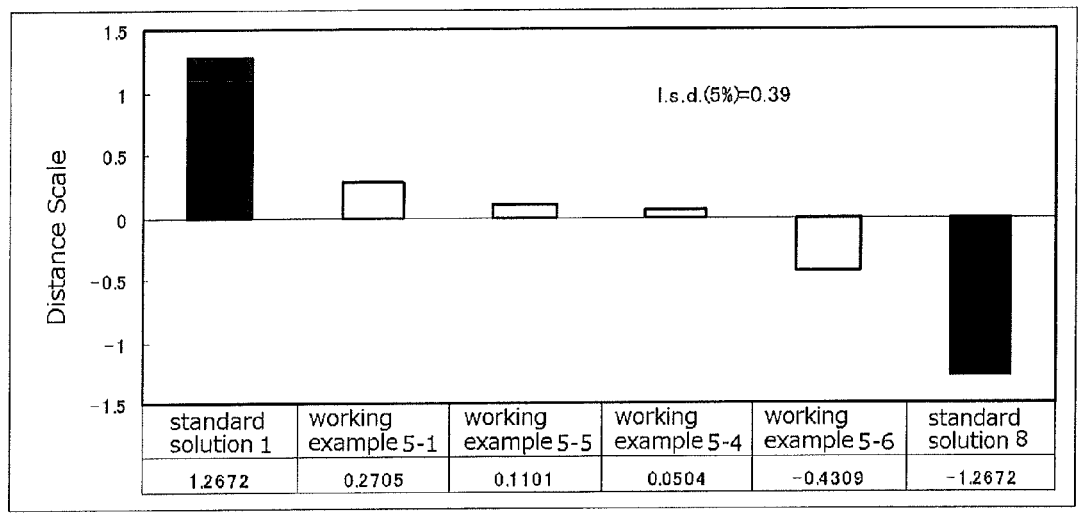
FIG. 19 shows the potassium chloride taste improvement effect of parsley extracts of different ethanol extraction concentrations in Working Example 5.

As shown in FIG. 19, no differences were found in the improvement effects of the 0 to 50 volume percent ethanol in water solution extracts, although a low improvement effect was found when using the 80 volume percent ethanol in water solution extract.

TABLE 11

| | Yield (g) |
|---|---|
| Extract powder 5-1 | 1.90 |
| Extract powder 5-4 | 2.15 |
| Extract powder 5-5 | 2.16 |
| Extract powder 5-6 | 1.92 |

(3) Extraction pH

Figure 20:
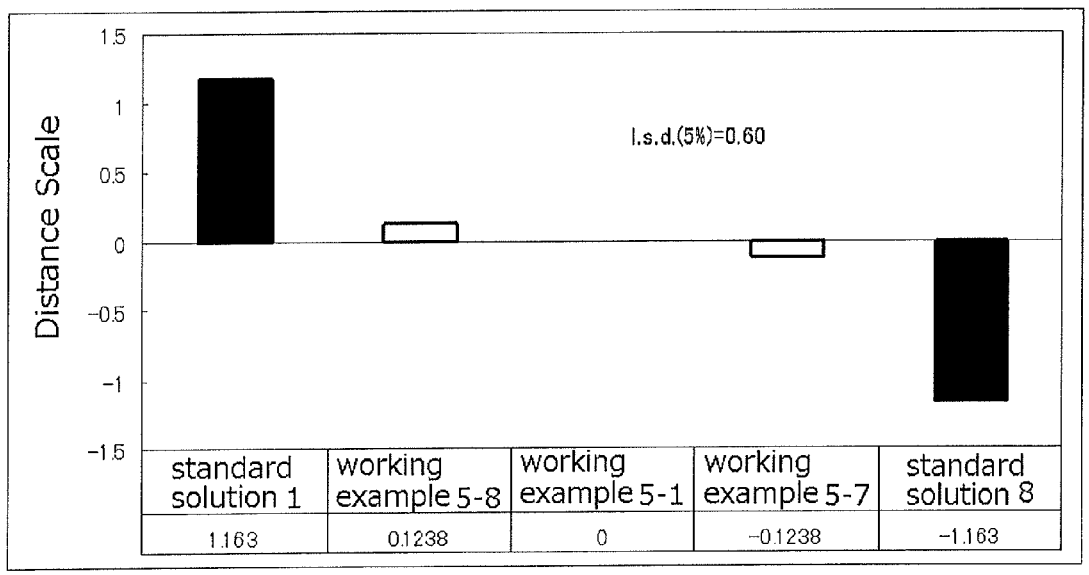
FIG. 20 shows the potassium chloride taste improvement effect of parsley extracts of different extraction pH values in Working Example 5.

Distilled water was added to 5 g of parsley dried powder to produce a 200 g mixture. Then, 1N hydrochloric acid or sodium hydroxide was used to adjust the pH value to 4.0 or 8.0. After thermal extraction for 2 hours in a 30° C. water bath, the mixture was centrifuged and filtered through filter paper. The obtained filtrate solution was evaporated under vacuum to produce solids as the extract powders 5-7 and 5-8, respectively. Yields of the obtained extract powders are shown in Table 12. The extract powder was added to standard solution 8 to reach a final concentration of 0.1 percent by weight and obtain the working example samples 5-7 and 5-8, respectively. The evaluations were performed by evaluation method 1. The distance scale of each of the samples is shown in FIG. 20. No significant difference in improvement effect due to extraction pH was found. However, a tendency was found for the improvement effect of the pH 4.0 extract to be somewhat weakened.

TABLE 12

| | Yield (g) |
|---|---|
| Extract powder 5-1 | 1.90 |
| Extract powder 5-7 | 1.71 |
| Extract powder 5-8 | 2.13 |

Working Example 6

Effect of Phospholipid to Improve Unpleasant Flavor of Potassium Chloride
(1) Check of Effect of Phospholipid to Improve Unpleasant Flavor of Potassium Chloride Phosphatidylcholine (PC), phosphatidylserine (PS), phosphatidylethanolamine (PE) (the above dioleoyl thereof), phosphatidic acid (PA) (distearoyl thereof), or phosphatidylinositol (PI) (soybean-derived) listed in Table 13 at 98 percent or greater purity was added to the standard solution 8 to reach a concentration of 0.02 percent, and evaluations were performed by the evaluation method 1.

TABLE 13

| Sample no. | Test sample name |
| --- | --- |
| Working Example 6-1 | Phosphatidylcholine (PC) |
| Working Example 6-2 | Phosphatidylserine (PS) |
| Working Example 6-3 | Phosphatidylethanolamine (PE) |
| Working Example 6-4 | Phosphatidic acid (PA) |
| Working Example 6-5 | Phosphatidylinositol (PI) |

Figure 21:
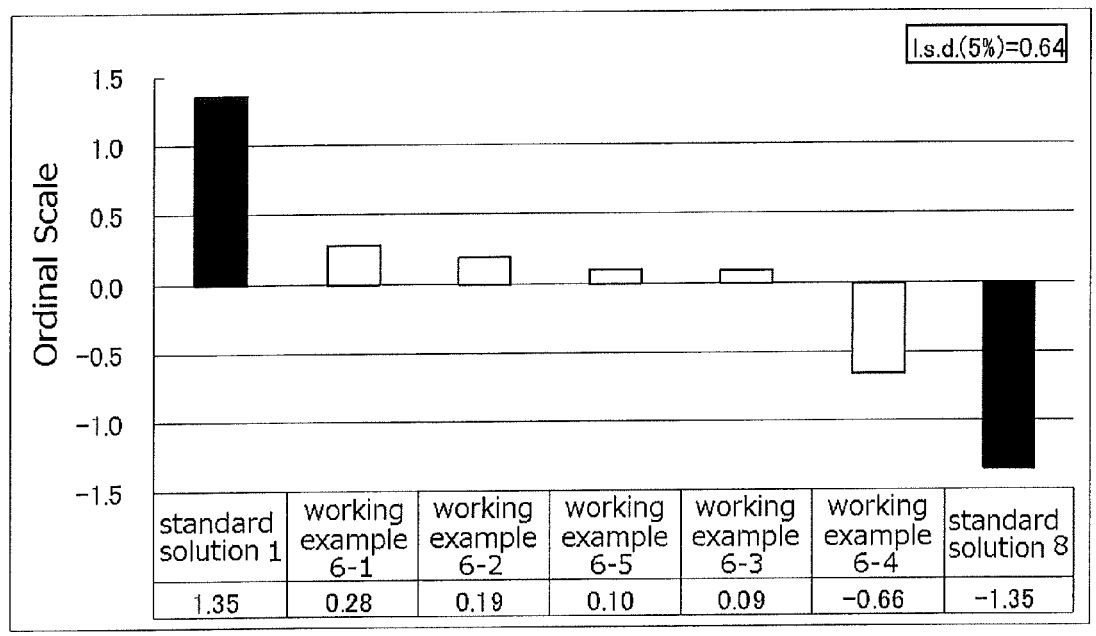
FIG. 21 shows the potassium chloride taste improvement effect of phospholipid in Working Example 6.

The distance scale of each of the samples is shown in FIG. 21. As shown in FIG. 21, although an effect by each phospholipid was found for improvement of unpleasant flavor of potassium chloride, high effects were found for PC, PS, PI, and PE among these phospholipids. On the other hand, the taste improvement effect of PA was found to be low.

Figure 22:
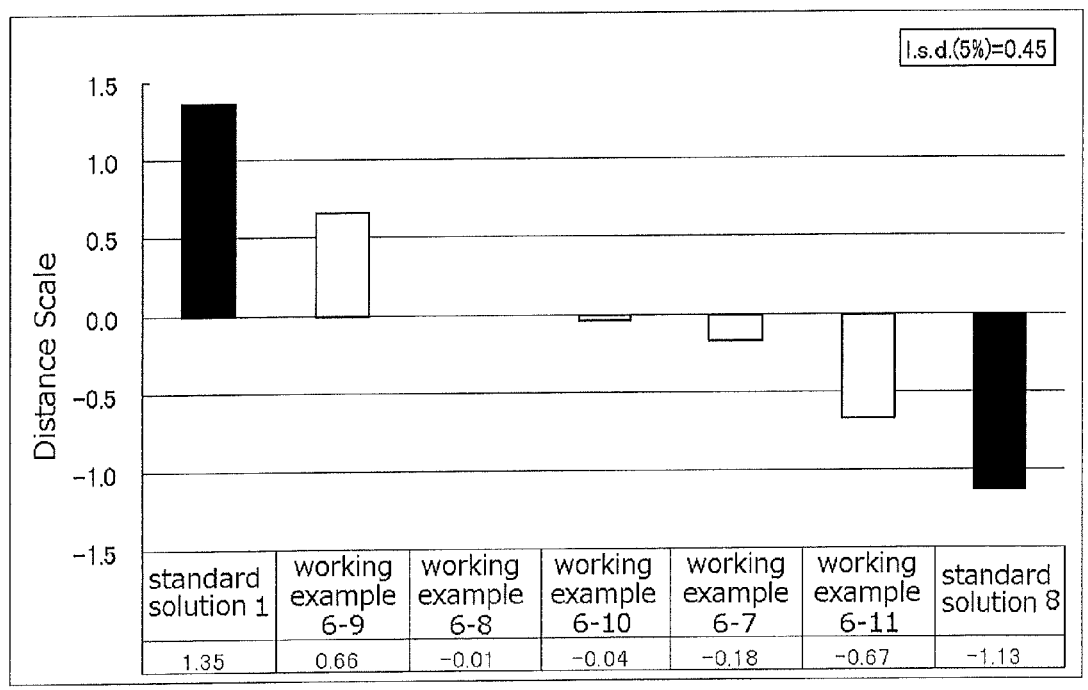
FIG. 22 shows the potassium chloride unpleasant taste improvement effect and the mixing ratios of phosphatidylcholine and lysophosphatidylcholine in Working Example 6.

(2) Effect of Mixture of Phosphatidylcholine and Lysophosphatidylcholine for Improvement of Unpleasant Flavor of Potassium Chloride Working Example 6-1 and lysophosphatidylcholine (LPC, at least 98 percent purity) at the mixing ratio shown in Table 14 were added to the standard solution 8 to reach a final total concentration of 0.02 percent to prepare an evaluation solution, and evaluation was performed by the evaluation method 1. The distance scale of each of the samples is shown in FIG. 22. As shown in FIG. 22, the maximum improvement effect was found for the Working Example 6-9 mixing ratio of 50:50. It was understood that combined use of the lyso form and phospholipid had a synergistic effect that was greater than use of the phospholipid alone.

TABLE 14

| | Mixing ratio (%) | |
| --- | --- | --- |
| Sample no. | Working Example 6-1 | Working Example 6-6 |
| Working Example 6-7 | 100 | 0 |
| Working Example 6-8 | 75 | 25 |
| Working Example 6-9 | 50 | 50 |
| Working Example 6-10 | 25 | 75 |
| Working Example 6-11 | 0 | 100 |

Working Example 7

Effects of Phosphatidylcholines Derived from Various Types of Materials in the Improvement of Unpleasant Flavor of Potassium Chloride (1) Extraction of Total Lipids Each of the raw materials shown in Table 15 was freeze dried and ground to produce a respective powder sample. Total lipids were extracted from each of the powder samples using the Bligh-Dyer method. That is to say, 100 mL of 0.1M potassium chloride solution, 250 mL of ethanol, and 125 mL of chloroform were added to 50 g of a respective powder sample, and the mixture was stirred for 2 minutes. After the mixture was allowed to sit for 10 minutes at room temperature, 125 mL of chloroform was added, and the mixture was stirred for 30 seconds. Then, 125 mL of 0.1M potassium chloride was further added, and the mixture was stirred for 30 seconds. This mixture was filtered through filter paper (no. 2, manufactured by Advantec Toyo K.K.) to remove the solids residue. The solution was then allowed to sit for at least 2 hours. The lower layer was recovered, and an equivalent volume of a mixed solution was added (0.1 M KCl:ethanol:chloroform=47:48:3). After 30 minutes of shaking, the mixture was allowed to sit overnight. The lower layer was recovered the next day. After filtration through filter paper, the solution was concentrated under vacuum to produce solids and obtain the total lipid sample.

TABLE 15

| Sample no. | Raw material name |
| --- | --- |
| Working Example 7-1 | Beef |
| Working Example 7-2 | Pork liver |
| Working Example 7-3 | Chicken liver |
| Working Example 7-4 | Egg yolk |
| Working Example 7-5 | Squid |
| Working Example 7-6 | Anchovy |
| Working Example 7-7 | Pollock ovary |
| Working Example 7-8 | Salmon testes |
| Working Example 7-9 | Krill |
| Working Example 7-10 | Soybean |
| Working Example 7-11 | Chestnut |
| Working Example 7-12 | Rice |
| Working Example 7-13 | Brewer's yeast |

(2) Phosphatidylcholine Fraction

About 5 g of a total lipid sample obtained in section (1) was dissolved in 10 mL of chloroform, and the resultant solution was loaded into a 40 mL silica gel column. The column was washed in turn using 20 column volumes of chloroform, 20 column volumes of acetone, and 7.5 column volumes of 87 volume percent ethanol. Then, an adsorbed fraction was extracted and recovered using 30 column volumes of 87 volume percent ethanol. After the obtained adsorbed fraction was concentrated under vacuum to obtain solids, the fraction was confirmed to be phosphatidylcholine (PC) by thin layer chromatography (silica gel plate, developing solvent—chloroform: methanol:acetic acid:water=70:25:1:2). This fraction was used as the PC fraction.

(3) Measurement of Phosphatidylcholine Content

The phosphatidylcholine sample obtained in section (2) was dispersed in distilled water to obtain sample solutions having concentrations of 20 to 50 mg/mL. A phospholipid concentration measurement kit (product name=Wako Phospholipids C Test, produced by Wako Pure Chemical Industries, Ltd.) was used for measurement of the phosphatidylcholine concentration of the sample solution.

(4) Effect of Phosphatidylcholines Derived from Various Types of Materials for Improvement of Unpleasant Flavor of Potassium Chloride Concentration of the phosphatidylcholine fraction obtained by the methods of sections (1) and (2) was confirmed by the method of section (3). Thereafter, each sample was added to standard solution 8 to produce a respective evaluation solution to reach a final phosphatidylcholine concentration of 0.02 percent. Evaluations were performed by the evaluation method 1.

Figure 23:
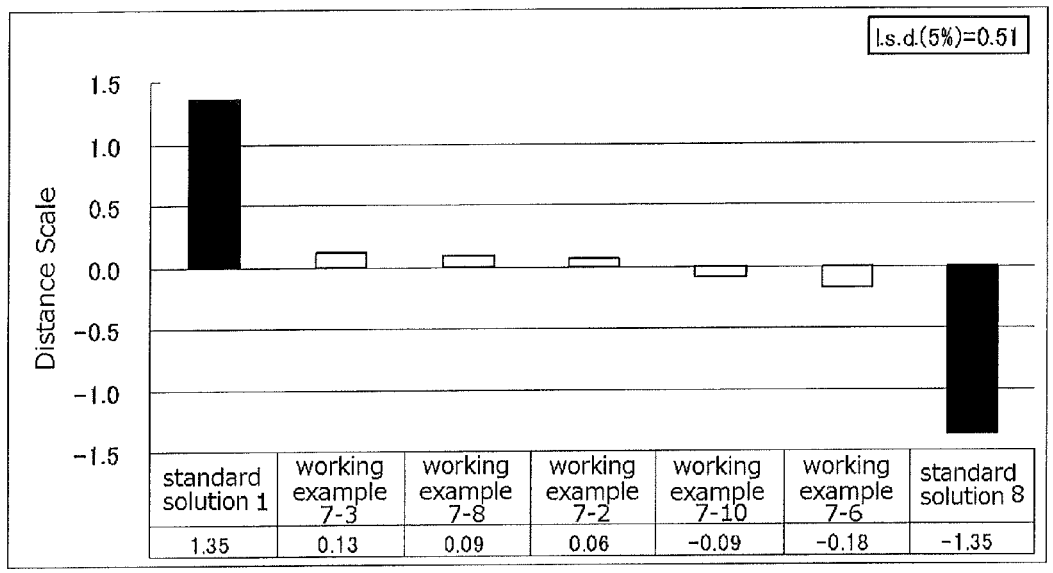
FIG. 23 shows the potassium chloride taste improvement effect of phosphatidylcholines derived from chicken liver, salmon testes, pig liver, soybean, and anchovy in Working Example 7.
Figure 24:
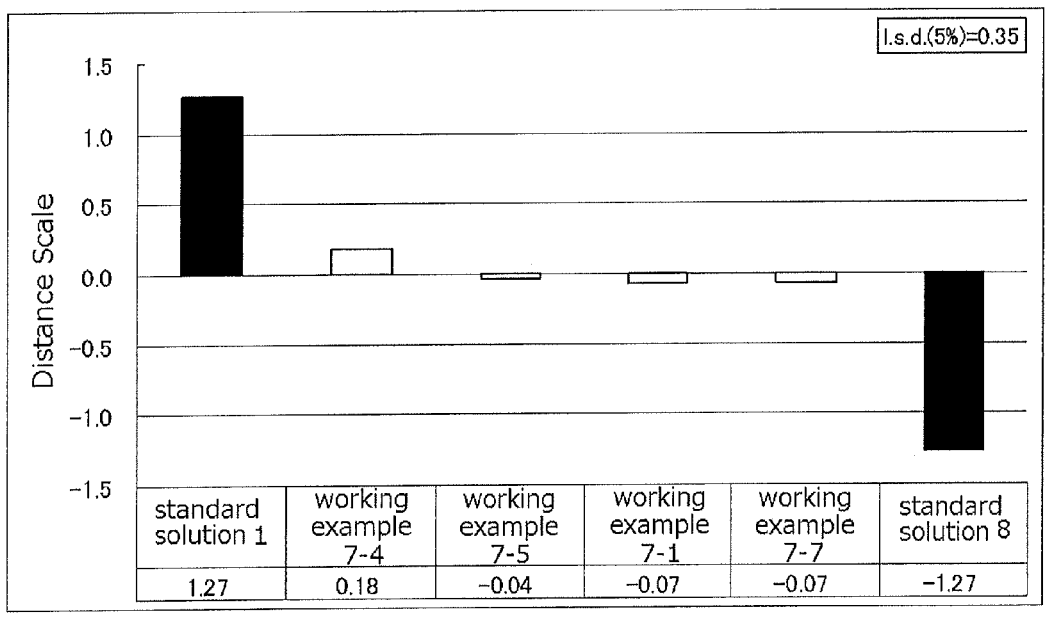
FIG. 24 shows the potassium chloride taste improvement effect of phosphatidylcholines derived from egg yolk, squid, beef, and Pollock ovary in Working Example 7.
Figure 25:
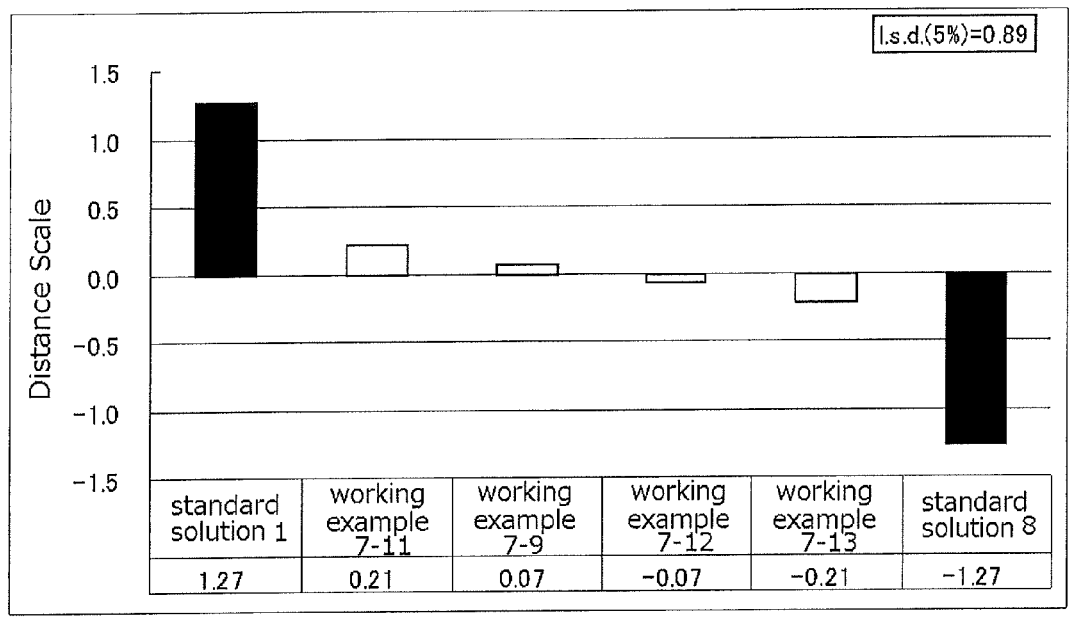
FIG. 25 shows the potassium chloride taste improvement effect of phosphatidylcholines derived from chestnut, krill, rice, and brewer's yeast in Working Example 7.

The distance scale of each of the samples is shown in FIGS. 23 to 25. As shown in FIGS. 23 to 25, an improvement effect was found for each of the samples of Working Examples 7-1 to 7-13. Moreover, significant differences were not found between the effects of each of the samples, and each of the samples had a roughly similar effect.

(5) Concentration of Soybean Lecithin and Effect of Improvement of Unpleasant Flavor of Potassium Chloride In consideration of savoriness, yield, cost, or the like, the materials thought to be most realistic for formulation among the Working Examples 7-1 to 7-13 were soybean-derived lecithin (produced by Wako Pure Chemical Industries, Ltd.) and soybean-derived high purity lecithin (product name=SLP-White, produced by Tsuji Oil Mills Co., Ltd.). These samples were used in the below listed testing. Sample numbers and phospholipid purity are listed in Table 16.

TABLE 16

| Sample no. | Test sample name | Phospholipid purity |
| --- | --- | --- |
| Working Example 7-14 | Soybean-derived lecithin | 60 percent or more |
| Working Example 7-15 | Soybean-derived high purity lecithin | 96 percent or more |

Figure 26:
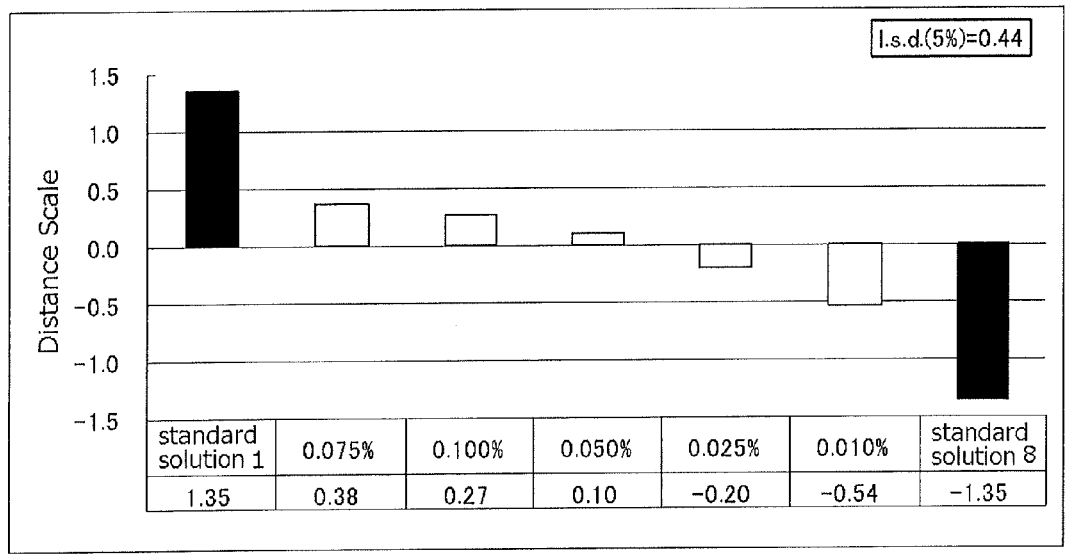
FIG. 26 shows the potassium chloride taste improvement effect and the added amount of soybean lecithin in Working Example 7.

The Working Example 7-14 was added to the standard solution 8 to produce evaluation solutions at concentrations of 0.01, 0.025, 0.05, 0.075 and 0.1 percent. The evaluation method 1 was used for evaluation. The distance scale of each of the samples as a result of this evaluation is shown in FIG. 26. As shown in FIG. 26, although the effect increased in a concentration-dependent manner up to a concentration of 0.075 percent, no trend for an increased effect was seen at greater concentrations.

(6) Quantitative Measurement of Effect of Phosphatidylcholine and Soybean Lecithin in Improvement of Unpleasant Flavor of Potassium Chloride To standard solution 4, 6, or 8 was added Working Example 6-1 (0.02 percent), Working Example 7-14 (0.1 percent), or Working Example 7-15 (0.05 percent) to produce evaluation solutions. These evaluation solutions were evaluated by evaluation method 2. These results and the values for standard solutions 4, 6, and 8 are shown in FIG. 27.

Figure 27:
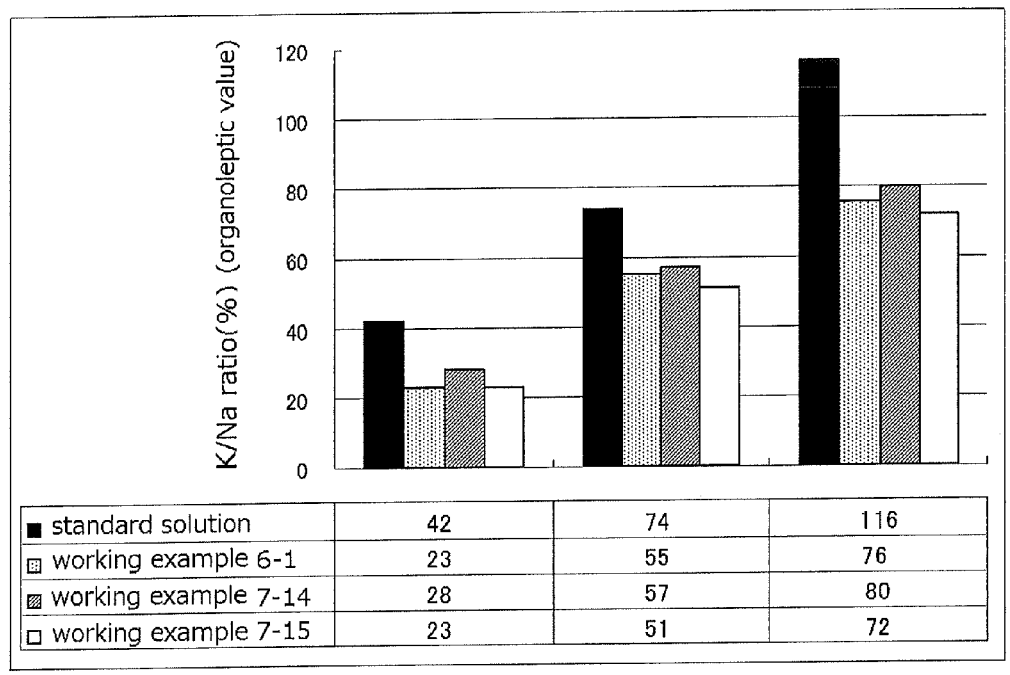
FIG. 27 shows the quantitative measurement of the effect of phosphatidylcholine and soybean lecithin in improvement of unpleasant flavor of potassium chloride in Working Example 7.

As shown in FIG. 27, soybean lecithin of any purity was effective for improvement of unpleasant flavor.

Working Example 8

(1) Unpleasant Taste Distinguishable Concentration of Potassium Chloride

Figure 28:
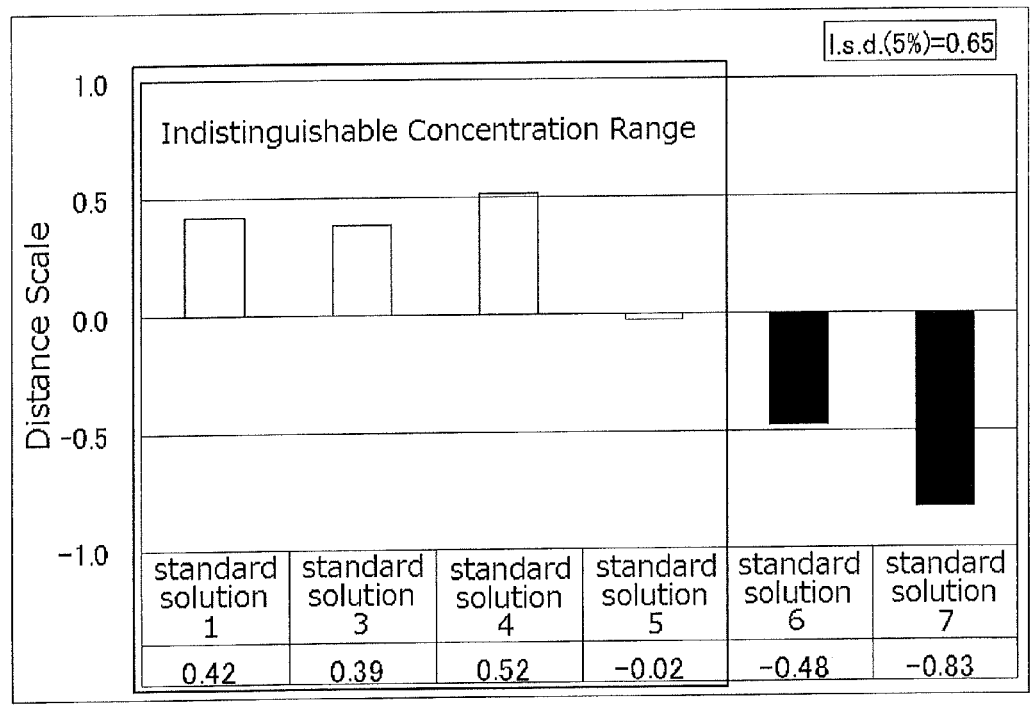
FIG. 28 shows the general potassium chloride unpleasant taste distinguishable concentration in Working Example 8.

Standard solutions 1 to 7 (with the exception of standard solution 2) were evaluated by a panel (n=11) by blind-testing to determine the order of potassium chloride unpleasant flavor intensity. As a result, no significant difference was found between the standard solution 1 (K/Na ratio=6 percent) to the standard solution 5 (K/Na ratio=57 percent) as shown in FIG. 28, showing that the unpleasant flavor of potassium chloride was not generally recognized at potassium chloride concentrations of K/Na ratios less than or equal to 57 percent for chicken stock soup models.

(2) Effect of Three-Component Mixture (Saccharide, Vegetable Extract, and Phospholipid) on Improvement of Unpleasant Flavor of Potassium Chloride To the standard solution 8 were added trehalose, Working Example 1 parsley extract, and the soybean-derived lecithin of Working Example 7-14 at the concentrations shown in Table 17 to prepare evaluation solutions. Evaluation was performed by the evaluation method 1.

TABLE 17

| | Added concentration (%) | | |
| --- | --- | --- | --- |
| Sample no. | Trehalose | Parsley extract | Soybean-derived lecithin |
| Working Example 8-1 | 1.0 | 0.06 | — |
| Working Example 8-2 | 1.0 | — | 0.06 |
| Working Example 8-3 | — | 0.06 | 0.06 |
| Working Example 8-4 | 1.0 | 0.06 | 0/06 |

Figure 29:
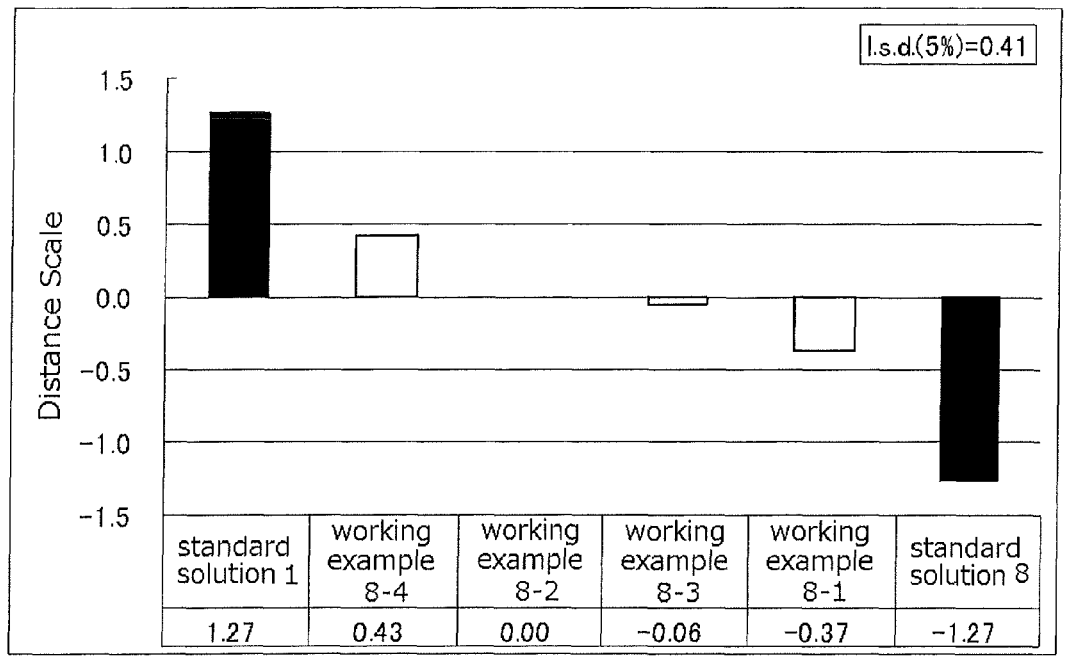
FIG. 29 shows the potassium chloride taste improvement effect due to mixing of two or three types of components among trehalose, parsley extract, and soybean lecithin in Working Example 8.

The distance scale of each of the samples is plotted in FIG. 29. As shown in FIG. 29, a higher effect was displayed by a 3-component mixture than by the 2-component mixture. Increasing the added concentration of each material independently in order to further increase the effect of improvement of the unpleasant flavor of potassium chloride would greatly affect the flavor and savoriness of the soup due to addition of the characteristic flavor and savoriness of each material, and thus such increase of added amount of a single material would be difficult for a foodstuff application. However, addition of a 3-component mixture attains a sufficient unpleasant flavor improvement effect without affecting savoriness of the foodstuff, so addition of a 3-component mixture may be realized.

(3) Combination of Saccharide with Vegetable Extract and Phospholipid

The parsley extract of Working Example 1, the soybean derived lecithin of Working Example 7-14, and various types of saccharides listed in Table 18 were added to the standard solution 8 to prepare evaluation solutions. Evaluations were performed using the evaluation method 1. Six types of saccharides were used, i.e. the monosaccharide glucose (produced by Wako Pure Chemical Industries, Ltd.), the disaccharides maltose (produced by Wako Pure Chemical Industries, Ltd.) and trehalose (produced by Hayashibara Co., Ltd.), and the hydrogenated starch syrups ESUI 100 (produced by B Food Science Co., Ltd.), HS-500 (produced by Hayashibara Co., Ltd.), and NT-1 (produced by Mitsubishi Shoji Foodtech Co., Ltd.).

TABLE 18

| | Added concentration (%) | | |
| --- | --- | --- | --- |
| Sample no. | Parsley extract | Soybean-derived lecithin | Sugar |
| Working Example 8-8 | 0.06 | 0.06 | — |
| Working Example 8-9 | 0.06 | 0.06 | Glucose 1.0 |
| Working Example 8-10 | 0.06 | 0.06 | Maltose 1.0 |
| Working Example 8-11 | 0.06 | 0.06 | Trehalose 1.0 |
| Working Example 8-12 | 0.06 | 0.06 | ESUI 100 1.0 |
| Working Example 8-13 | 0.06 | 0.06 | HS-500 1.0 |
| Working Example 8-14 | 0.06 | 0.06 | NT-1 .10 |

Figure 30:
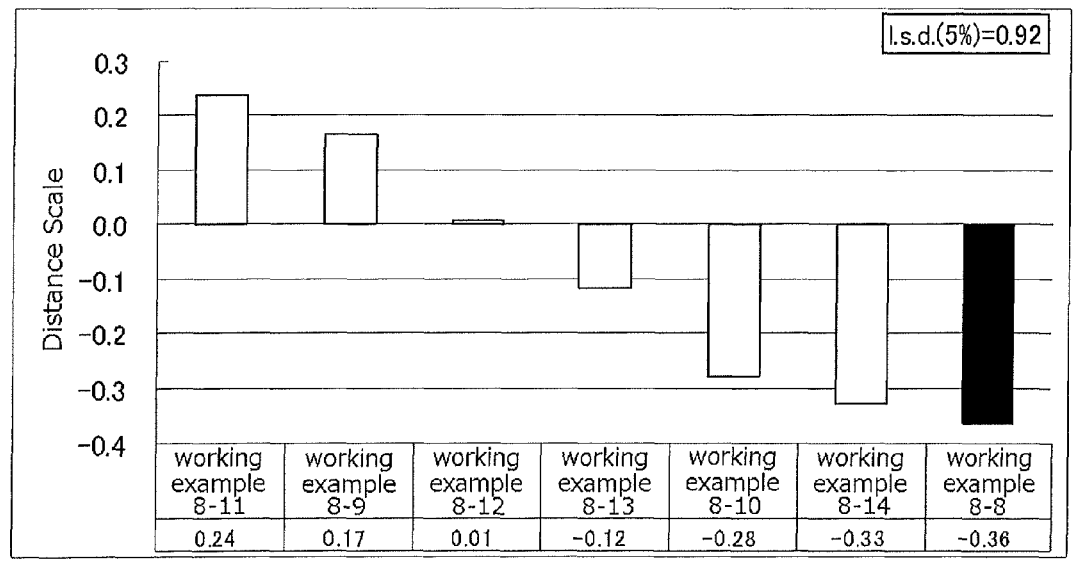
FIG. 30 shows the potassium chloride taste improvement effect and the type of a saccharide added along with parsley extract and soybean lecithin in Working Example 8.

As shown in FIG. 30, the effect of addition of the saccharide was found to be roughly the same for each type of saccharide. However, the flavor of the saccharide-supplemented foodstuff was greatly affected by addition of a strongly sweet saccharide, and from that standpoint, the low sweetness hydrogenated starch syrup is preferred.

(4) Quantitative Measurement of Effect of Saccharide, Vegetable Extract, Phospholipid Three-Component Mixture in Improvement of Unpleasant Flavor of Potassium Chloride Evaluation solutions were prepared by adding the blends of Working Examples 8-11 to the standard solutions 4, 6, and 8. Evaluations were performed by the evaluation method 2. These results are shown in FIG. 31.

Figure 31:
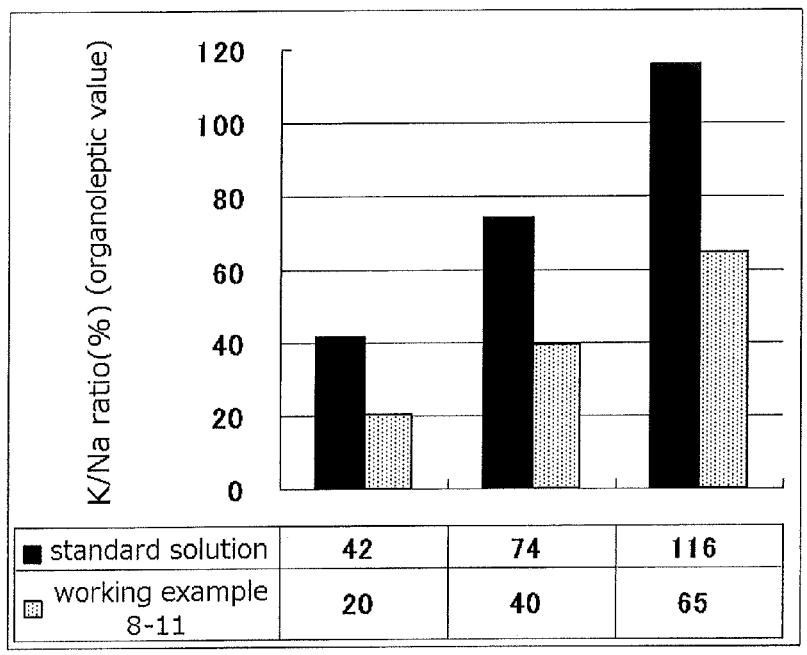
FIG. 31 shows quantitative measurement of the effect of trehalose, parsley extract, soybean lecithin three-component mixture in improvement of unpleasant flavor of potassium chloride in Working Example 8.

As shown in FIG. 31, the strong unpleasant flavor at the 116 percent K/Na ratio level was found to be improved to that of 65 percent, the 74 percent K/Na ratio level was found to be improved to that of 40 percent, and the 42 percent K/Na ratio level was found to be improved to that of 20 percent.

Comparative Examples

Comparison of Potassium Chloride Unpleasant Flavor Improvement Effect with Conventional Technology At a concentration (Table 19) that would not greatly affect flavor and savoriness, glucose 6 monosodium phosphate (produced by Wako Pure Chemical Industries, Ltd.), trehalose (product name=TREHA, produced by Hayashibara Co., Ltd.), a saltiness enhancing spice (product name=Salt Taste Flavor, produced by Ogawa & Co., Ltd.), or γ-polyglutamic acid (produced by Nippon Poly-Glu Co., Ltd.) was added to the standard solution 8, and evaluations were performed by the evaluation method 2. When the sample contained sodium, the table salt used during preparation of the soup was decreased by the amount of table salt derived from the sample so that the total sodium chloride concentrations of the evaluation solutions were made equal for all the samples. In addition to the above, the results of Working Examples 8-11 are included, and the K/Na ratio (%) of each sample is shown in FIG. 32.

TABLE 19

| Sample no. | Test sample name | Added concentration (%) |
|---|---|---|
| Comparative Example 1 | Glucose 6 monosodium phosphate | 0.50 |
| Comparative Example 2 | Trehalose | 1.00 |
| Comparative Example 3 | Salt Taste Flavor | 0.50 |
| Comparative Example 4 | γ-polyglutamic acid enzyme decomposition product | 0.10 |

Figure 32:
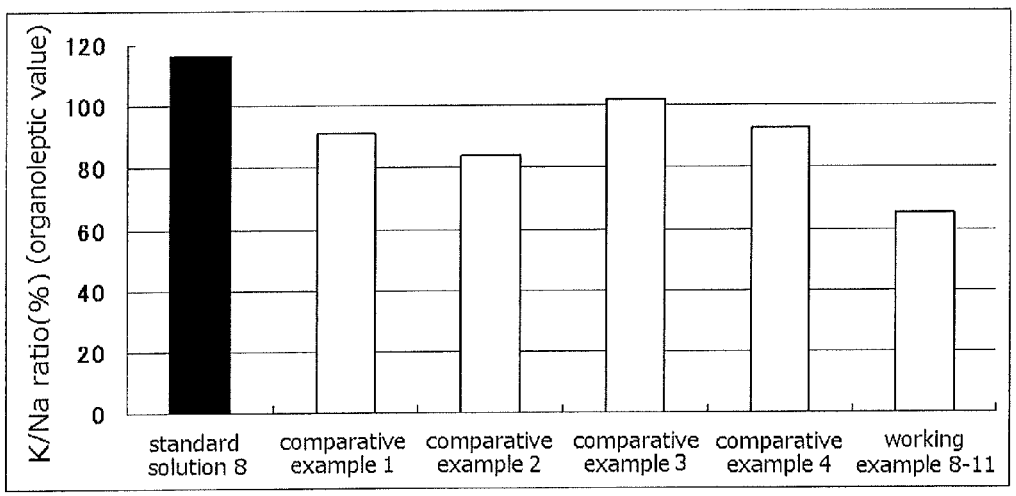
FIG. 32 shows the potassium chloride taste improvement effect of the taste improver of the present invention and of a conventional taste improver in a Comparative Example.

As shown in FIG. 32, these results show that the Working Examples 8-11 were highly effective in the improvement of the unpleasant flavor of potassium chloride in comparison to the conventional flavor improvement technology.

Working Example 9

Effect of Mixture of Saccharide, Vegetable Extract, Phospholipid, and Arginine in Improvement of Unpleasant Flavor of Potassium Chloride The effects of mixtures of saccharide, parsley extract of Working Example 1, the soybean-derived lecithin of Working Examples 7-14, and arginine in improvement of the unpleasant flavor of potassium chloride were compared to Comparative Example 9-1 as standard products based on evaluation by the evaluation method 2. The blends are listed in Table 20. Malic acid was used for pH adjustment when arginine (i.e. basic amino acid) was added, although the added amount of malic acid was minute, so it was confirmed that such addition had nearly no effect on the unpleasant flavor improvement effect.

Figure 33:
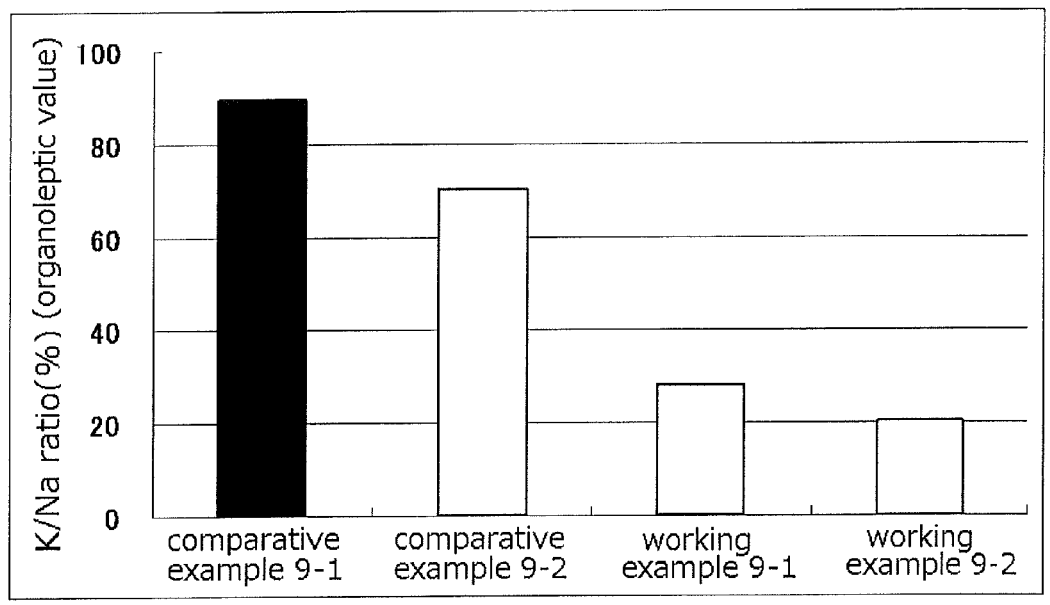
FIG. 33 shows the potassium chloride taste improvement effect due to mixing of trehalose, parsley extract, soybean lecithin, and arginine in Working Example 9.

As shown in FIG. 33, the Working Example 9-2 displayed the greatest flavor improvement effect. A potassium chloride unpleasant flavor improvement effect was found to decrease the unpleasant flavor down to a level (K/Na ratio of 57 percent or less) that was shown in Working Example 8-(1) not to be generally sensed as an unpleasant flavor.

TABLE 20

| (unit: wt. %) | Comparative Example 9-1 | Comparative Example 9-2 | Working Example 9-1 | Working Example 9-2 |
|---|---|---|---|---|
| Chinese soup stock granules | 1.32 | 1.32 | 1.32 | 1.32 |
| NaCl | 0.19 | 0.19 | 0.19 | 0.19 |
| KCl | 0.66 | 0.66 | 0.66 | 0.66 |
| Arg | | 0.10 | 0.10 | 0.10 |
| Malic acid | | 0.05 | 0.05 | 0.05 |
| Trehalose | | — | — | 1.00 |
| Parsley extract | | — | 0.05 | 0.05 |
| Soybean-derived lecithin | | — | 0.05 | 0.05 |
| Water | 97.83 | 97.68 | 97.58 | 96.58 |
| Total | 100.00 | 100.00 | 100.00 | 100.00 |
| K/Na ratio (%) | 89.39 | 89.39 | 89.39 | 89.39 |

Working Example 10

Evaluation of Potassium Chloride Unpleasant Flavor Improvement Effect of the Present Invention Taste Improver in Tomato Soup (1) Preparation of Tomato Soup Kagome brand canned whole ripened tomatoes (produced by Kagome Co., Ltd.) and Kagome brand canned sliced ripened tomatoes (produced by Kagome Co., Ltd.) were uniformly mixed using a juicer-mixer to produce a tomato paste (1:3 mixture). 1 kg of minced onion was mixed with 50 g of canola oil (produced by Showa Sangyo Co., Ltd.) and 20 g of chopped garlic, and the mixture was heated until the total weight reached 0.95 kg. Thereafter, the mixture was mixed uniformly using a food processor to produce an onion paste. The tomato paste and onion paste were mixed at a 2:1 ratio to produce the tomato soup base. 300 g of tomato soup base, 12 g of consommé granules (produced by Ajinomoto Co, Inc.), and an appropriate amount of salt were blended, and water was added to obtain a total weight of 1 kg. This mixture was heated for 30 minutes at 80° C. in a hermetically sealed state to produce the tomato soup. Sodium chloride content and potassium chloride content of the tomato soup were checked by the aforementioned method of section (1) of "Analyses and Analytical Methods Used in the Working Examples".

(2) Preparation of Standard Tomato Soup for Evaluation of Potassium Chloride Unpleasant Flavor Improvement Effect As shown in Table 21, consommé granules, sodium chloride, and potassium chloride were added to tomato soup base to produce tomato soup standard products 1 to 5. The potassium chloride unpleasant flavor intensity increased in a step wise manner for the standard products 1 to 5.

TABLE 21

| (unit: g) | Standard Product 1 | Standard Product 2 | Standard Product 3 | Standard Product 4 | Standard Product 5 |
|---|---|---|---|---|---|
| Tomato soup base | 300.00 | 300.00 | 300.00 | 300.00 | 300.00 |
| Consommé granules | 12.00 | 12.00 | 12.00 | 12.00 | 12.00 |
| NaCl | 7.32 | 5.43 | 4.17 | 2.91 | 1.65 |
| KCl | — | 2.10 | 4.62 | 7.14 | 9.66 |
| Water | 680.68 | 680.47 | 679.21 | 677.95 | 676.69 |
| Total | 1000.00 | 1000.00 | 1000.00 | 1000.00 | 1000.00 |
| Actual measured NaCl value (%) | 1.26 | 1.07 | 0.95 | 0.82 | 0.69 |
| Actual measured KCl value (%) | 0.17 | 0.38 | 0.63 | 0.88 | 1.13 |
| KCl/NaCl (%) | 13.33 | 35.29 | 66.67 | 107.69 | 163.64 |

(3) Effect of Improvement of Unpleasant Flavor of Potassium Chloride in Tomato Soup Tomato soups of the blends shown in Table 22 were produced in order to check the effect in tomato soups of trehalose, the parsley extract of Working Example 1, the soybean-derived high purity lecithin of Working Example 7-15, and arginine. Based on comparison with the aforementioned tomato soup standard products, the unpleasant flavor intensity corresponding to the respective soup was expressed by K/Na ratio based on the evaluation method 2.

TABLE 22

| (unit: g) | Comparative Product 10-1 | Working Example 10-2 | Working Example 10-2 |
|---|---|---|---|
| Tomato soup base | 300.00 | 300.00 | 300.00 |
| Consommé granules | 12.00 | 12.00 | 12.00 |
| NaCl | 1.65 | 1.65 | 1.65 |
| KCl | 8.02 | 8.02 | 8.02 |
| Arg | — | — | 0.10 |
| Malic acid | — | — | 0.05 |
| Trehalose | — | 1.00 | 1.00 |
| Parsley extract | — | 0.05 | 0.05 |
| Soybean-derived high purity lecithin | — | 0.03 | 0.03 |

TABLE 22-continued

| (unit: g) | Comparative Product 10-1 | Working Example 10-2 | Working Example 10-2 |
|---|---|---|---|
| Water | 678.33 | 677.25 | 677.10 |
| Total | 1000.00 | 1000.00 | 1000.00 |
| Actual measured NaCl value (%) | 0.69 | 0.69 | 0.69 |
| Actual measured KCl value (%) | 0.97 | 0.97 | 0.97 |
| KCl/NaCl (%) | 140.00 | 140.00 | 140.00 |

Figure 34:
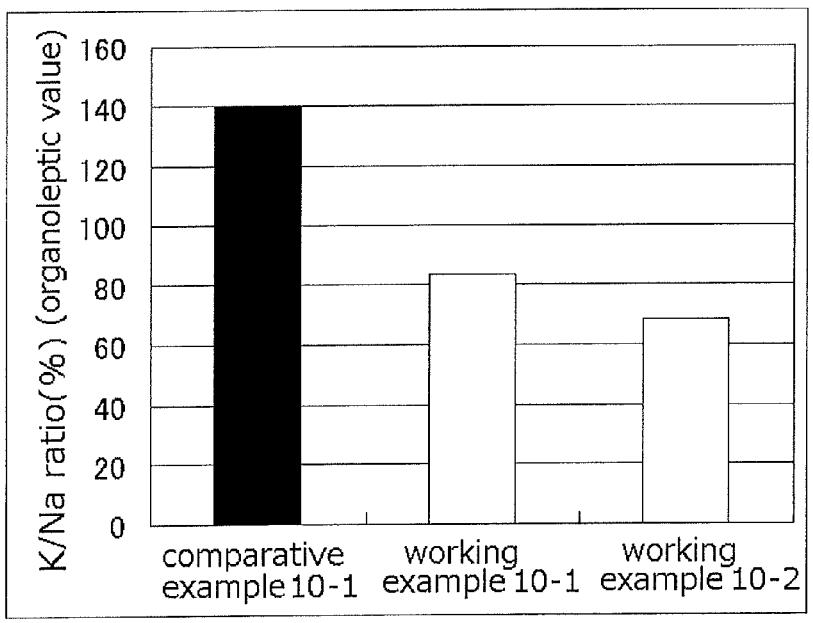
FIG. 34 shows the potassium chloride taste improvement effect in a tomato soup by the taste improver of the present invention in Working Example 10.

As shown in FIG. 34, the unpleasant flavor improver of the present invention could improve the unpleasant flavor of potassium chloride (i.e. bitterness, astringent taste, harsh taste, and bitter taste) for tomato soup without affecting flavor and savoriness of the soup. The effect of Working Example 10-2 was indicated to be particularly high.

Working Example 11

Evaluation of the Effect of the Taste Improver of the Present Invention in the Improvement of Potassium Chloride Unpleasant Flavor in Salmon Flakes (1) Preparation of Salmon Flakes 7.56 g of vegetable oil, 0.45 g of sodium glutamate, and 0.02 g of sodium inosinate were added to 94.52 g of heated salmon meat. Then, sodium chloride and potassium chloride were added as shown in Table 23. Water was then added, and the mixture was blended. The mixture was stirred and heated until total weight reached 100 g to produce salmon flake standard products 1 to 6. Potassium chloride unpleasant flavor intensity increased in a stepwise manner for the standard products 1 to 6. These standard products were evaluated for unpleasant flavor intensity based on the evaluation method 2.

TABLE 23

(unit: wt. %)

| | Standard Product 1 | Standard Product 2 | Standard Product 3 | Standard Product 4 | Standard Product 5 | Standard Product 6 |
|---|---|---|---|---|---|---|
| Heated salmon meat | 94.52 | 94.52 | 94.52 | 94.52 | 94.52 | 94.52 |
| Vegetable oil | 7.56 | 7.56 | 7.56 | 7.56 | 7.56 | 7.56 |
| L-monosodium glutamate | 0.45 | 0.45 | 0.45 | 0.45 | 0.45 | 0.45 |
| Sodium inosinate | 0.02 | 0.02 | 0.02 | 0.02 | 0.02 | 0.02 |
| NaCl | 4.10 | 3.44 | 3.44 | 2.56 | 2.12 | 1.68 |
| KCl | — | 0.44 | 0.44 | 1.76 | 2.42 | 3.08 |
| Water | 20.73 | 20.95 | 20.95 | 20.51 | 20.29 | 20.07 |
| Total prior to heating | 127.38 | 127.38 | 127.38 | 127.38 | 127.38 | 127.38 |
| Total after heating | 100.00 | 100.00 | 100.00 | 100.00 | 100.00 | 100.00 |
| Actual measured NaCl value (%) | 4.40 | 3.74 | 3.30 | 2.86 | 2.42 | 1.98 |
| Actual measured KCl value (%) | 0.55 | 0.99 | 1.65 | 2.31 | 2.97 | 3.63 |
| KCl/NaCl (%) | 12.46 | 26.47 | 50.00 | 80.77 | 122.73 | 183.33 |

7.56 g of vegetable oil, 0.45 g of monosodium glutamate, and 0.02 g of sodium inosinate were added to 94.52 g of heated salmon meat. Then, sodium chloride, potassium chloride, trehalose, the parsley extract of Working Example 1, the soybean-derived high purity lecithin of Working Example 7-15, and arginine were added as shown in Table 24. Water was added, and the mixture was blended. The mixture was stirred and heated until total weight reached 100 g to produce comparative product 11-1 and Working Examples 11-1 and 11-2. Potassium chloride unpleasant flavor intensity of these three types of salmon flakes was compared to that of the standard products 1 to 6, and the equivalent intensity was indicated as a K/Na ratio. Sodium chloride content and potassium chloride content of the standard products 1 to 6, Comparative Example 11-1, and Working Examples 11-1 and 11-2 were checked by the aforementioned method of section (1) of "Analyses and Analytical Methods Used in the Working Examples".

TABLE 24

| (unit: wt. %) | Comparative Product 11-1 | Working Example 11-1 | Working Example 11-2 |
|---|---|---|---|
| Heated salmon meat | 94.52 | 94.52 | 94.52 |
| Vegetable oil | 7.56 | 7.56 | 7.56 |

TABLE 24-continued

| (unit: wt. %) | Comparative Product 11-1 | Working Example 11-1 | Working Example 11-2 |
|---|---|---|---|
| L-monosodium glutamate | 0.45 | 0.45 | 0.45 |
| Sodium inosinate | 0.02 | 0.02 | 0.02 |
| NaCl | 1.68 | 1.68 | 1.68 |
| KCl | 2.62 | 2.62 | 2.62 |
| Arg | — | — | 0.18 |
| Malic acid | — | — | 0.05 |
| Trehalose | — | 1.00 | 1.00 |
| Parsley extract | — | 0.05 | 0.05 |
| Soybean-derived high purity lecithin | — | 0.05 | 0.05 |
| Water | 20.53 | 19.43 | 19.20 |
| Total prior to heating | 127.38 | 127.38 | 127.38 |
| Total after heating | 100.00 | 100.00 | 100.00 |
| Actual measured NaCl value (%) | 1.98 | 1.98 | 1.98 |
| Actual measured KCl value (%) | 3.17 | 3.17 | 3.17 |
| KCl/NaCl (%) | 160.00 | 160.00 | 160.00 |

Figure 35:
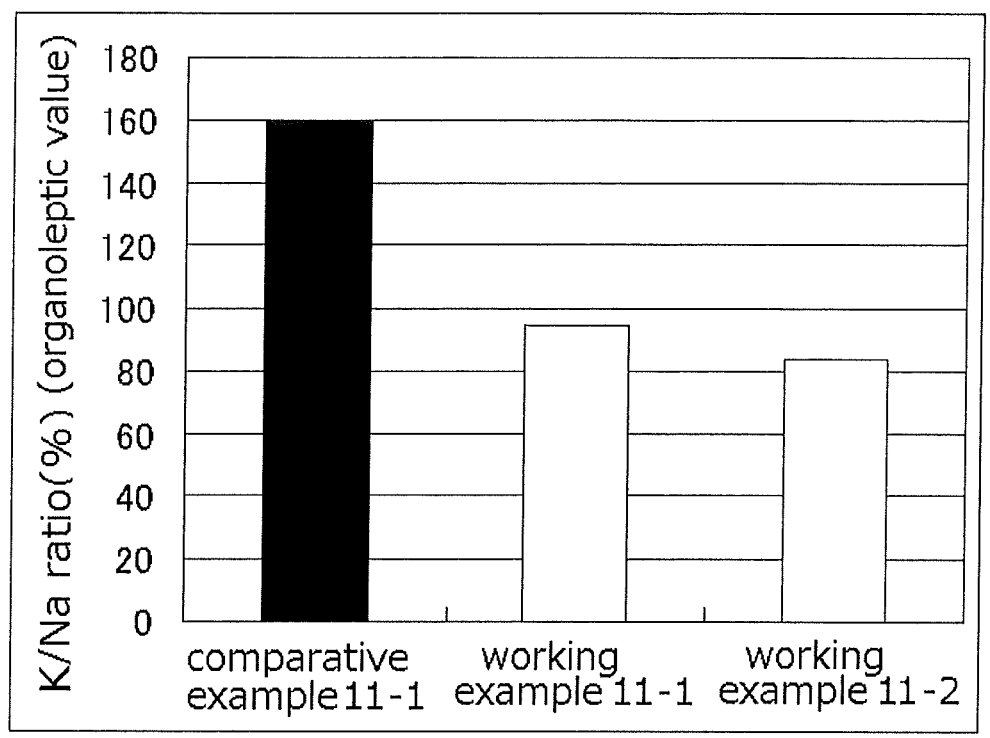
FIG. 35 shows the potassium chloride taste improvement effect in salmon flakes by the taste improver of the present invention in Working Example 11.

As shown in FIG. 35, the taste improver of the present invention could improve the unpleasant flavor of potassium chloride for the solid foodstuff salmon flakes without affecting flavor and savoriness of the salmon flakes. The effect of Working Example 11-2 was indicated to be particularly high.

Working Example 12

Effect of Improvement of Taste of Calcium Chloride, Magnesium Chloride, and Ammonium Chloride
(1) Calcium Chloride Taste Improvement Effect
Aqueous solutions were produced of stepwise increasing unpleasant flavor intensity by gradual increase of the added amount of calcium chloride relative to an equal concentration of sodium chloride. The detailed blends are shown in Table 25. The parsley extract of Working Example 1, the soybean-derived high purity lecithin of Working Example 7-15, trehalose, arginine, and malic acid were added to Working Example 12-5 using the blends shown in Table 26 to prepare evaluation solutions. The unpleasant flavor intensities of these evaluation solutions were evaluated based on the evaluation method 2. Comparative evaluations were made by an expert panel (n=8) using Working Examples 12-1 to 12-5 as standard solutions.

Results of evaluations of unpleasant flavor intensity are shown in Table 27. As shown in Table 27, the taste improver of the present invention was found to have an improvement effect for the unpleasant flavor of calcium chloride that was similar to that for the unpleasant flavor of potassium chloride.

TABLE 25

| Working Example | Unpleasant flavor intensity | NaCl (%) | CaCl$_2$ (%) | Details of unpleasant flavor |
|---|---|---|---|---|
| Working Example 12-1 | 0 | 0.49 | 0.00 | Unpleasant flavor was not sensed. |
| Working Example 12-2 | 1 | 0.49 | 0.14 | Only a slight astringent taste was sensed in the aftertaste. |
| Working Example 12-3 | 2 | 0.49 | 0.21 | Astringent taste was sensed from the initial taste to the aftertaste. |
| Working Example 12-4 | 3 | 0.49 | 0.28 | Strong astringent taste was sensed from the initial taste to the aftertaste. |
| Working Example 12-5 | 4 | 0.49 | 0.35 | Quite strong astringent taste was sensed from the initial taste to the aftertaste. |

TABLE 26

| (unit: wt. %) | Working Example 12-6 |
|---|---|
| NaCl | 0.49 |
| CaCl$_2$ | 0.35 |
| Trehalose | 1.00 |
| Parsley extract | 0.05 |
| Soybean-derived high purity lecithin | 0.05 |
| Arg | 0.10 |
| Malic acid | 0.04 |
| Water | 97.92 |
| Total | 100.00 |

TABLE 27

| Working Example | Unpleasant flavor intensity (average value) |
|---|---|
| Working Example 12-5 | 4.0 |
| Working Example 12-6 | 2.4 |

(2) Magnesium Chloride Taste Improvement Effect
Aqueous solutions were produced of stepwise increasing unpleasant flavor intensity by gradual increase of the added amount of magnesium chloride relative to an equal concentration of sodium chloride. The detailed blends are shown in Table 28. The parsley extract of Working Example 1, the soybean-derived high purity lecithin of Working Example 7-15, trehalose, arginine, and malic acid were added to Working Example 12-15 using the blends shown in Table 29 to prepare evaluation solutions. The unpleasant flavor intensities of these standard solutions were evaluated based on the evaluation method 2. Comparative evaluations were made by an expert panel (n=8) using Working Examples 12-11 to 12-15 as standard solutions.

Results of evaluations of unpleasant flavor intensity are shown in Table 30. As shown in Table 30, the taste improver of the present invention was found to have a improvement effect for the unpleasant flavor of magnesium chloride that was similar to that for the unpleasant flavor of potassium chloride.

TABLE 28

| Working Example | Unpleasant flavor intensity | NaCl (%) | MgCl$_2$ (%) | Details of unpleasant flavor |
|---|---|---|---|---|
| Working Example 12-11 | 0 | 0.49 | 0.00 | Unpleasant flavor was not sensed. |
| Working Example 12-12 | 1 | 0.49 | 0.10 | Slight bitterness was sensed in the aftertaste. |
| Working Example 12-13 | 2 | 0.49 | 0.20 | Slight bitter taste was sensed in the initial taste, and bitterness was sensed in the aftertaste. |
| Working Example 12-14 | 3 | 0.49 | 0.40 | Bitter taste was sensed in the initial taste, and strong bitterness was sensed in the aftertaste. |
| Working Example 12-15 | 4 | 0.49 | 0.50 | Strong bitter taste was sensed in the initial taste, and rather strong bitterness was sensed in the aftertaste. |

TABLE 29

| (unit: wt. %) | Working Example 12-16 |
|---|---|
| NaCl | 0.49 |
| MgCl$_2$ | 0.50 |
| Trehalose | 1.00 |
| Parsley extract | 0.05 |
| Soybean-derived high purity lecithin | 0.05 |
| Arg | 0.10 |
| Malic acid | 0.04 |
| Water | 97.77 |
| Total | 100.00 |

TABLE 30

| Working Examples | Unpleasant flavor intensity (average value) |
|---|---|
| Working Example 12-15 | 4.0 |
| Working Example 12-16 | 2.5 |

(3) Ammonium Chloride Taste Improvement Effect

Aqueous solutions were produced of stepwise increasing unpleasant flavor intensity by gradual increase of the added amount of ammonium chloride relative to an equal concentration of sodium chloride. The detailed blends are shown in Table 31. The parsley extract of Working Example 1, the soybean-derived high purity lecithin of Working Example 7-15, trehalose, arginine, and malic acid were added to Working Example 12-25 using the blends shown in Table 32 to prepare evaluation solutions. The unpleasant flavor intensities of these evaluation solutions were evaluated based on the evaluation method 2. Comparative evaluations were made by an expert panel (n=8) using Working Examples 12-21 to 12-25 as standard solutions.

Results of evaluations of unpleasant flavor intensity are shown in Table 33. As shown in Table 33, the taste improver of the present invention was found to have a improvement effect for the unpleasant flavor of ammonium chloride that was similar to that for the unpleasant flavor of potassium chloride.

TABLE 31

| Working Example | Unpleasant flavor intensity | NaCl (%) | NH$_4$Cl (%) | Details of unpleasant flavor |
|---|---|---|---|---|
| Working Example 12-21 | 0 | 0.49 | 0.00 | There was no unpleasant flavor. |
| Working Example 12-22 | 1 | 0.49 | 0.10 | Harsh taste was sensed in the aftertaste. |
| Working Example 12-23 | 2 | 0.49 | 0.20 | Slight harsh taste was sensed in the initial taste, and strong harsh taste was sensed in the aftertaste. |
| Working Example 12-24 | 3 | 0.49 | 0.40 | Harsh taste was sensed in the initial taste, and rather strong harsh taste was sensed in the aftertaste. |
| Working Example 12-25 | 4 | 0.49 | 0.50 | Strong harsh taste was sensed in the initial taste, and intense harsh taste was sensed in the aftertaste. |

TABLE 32

| (unit: wt. %) | Working Example 12-26 |
|---|---|
| NaCl | 0.49 |
| NH$_4$Cl | 0.50 |
| Trehalose | 1.00 |
| Parsley extract | 0.05 |
| Soybean-derived high purity lecithin | 0.05 |
| Arg | 0.10 |
| Malic acid | 0.04 |
| Water | 97.77 |
| Total | 100.00 |

TABLE 33

| Working Examples | Unpleasant flavor intensity (average value) |
|---|---|
| Working Example 12-25 | 4.0 |
| Working Example 12-26 | 3.5 |

Industrial Applicability

An excellent taste improver is provided by the present invention that is capable of improvement or lowering of the unpleasant bitterness, astringent taste, harsh taste, bitter taste, or the like of potassium salts, magnesium salts, calcium salts, and ammonium salts. When the sodium salt in a food or drink is replaced by a potassium salt, magnesium salt, calcium salt, or ammonium salt, it is possible to provide various types of reduced-salt foods or drinks that have good saltiness and excellent savoriness.

The invention claimed is:

1. A taste improvement method for a foodstuff comprising at least one salt selected from the group consisting of a potassium salt, a magnesium salt, a calcium salt, and an ammonium salt,
the taste improvement method comprising adding a taste improver comprising as an active ingredient, a vegetable extract, which comprises at least one material selected from the group consisting of apigenin, daidzin, and a glycoside of apigenin, to the foodstuff.

2. The taste improvement method according to claim 1, wherein the taste improver further comprises as an active ingredient a phospholipid.

3. The taste improvement method according to claim 2, wherein the phospholipid is phosphatidylcholine, phosphatidylserine, phosphatidylethanolamine, or phosphatidylinositol, or any of lyso forms thereof.

4. The taste improvement method according to claim 3, wherein the phospholipid is an extract of a plant, an animal, a fungus, or combinations thereof.

5. The taste improvement method according to claim 2, wherein the phospholipid comprises at least one material selected from the group consisting of phosphatidylcholine, phosphatidylserine, phosphatidylethanolamine, phosphatidylinositol, and any of lyso forms thereof.

6. The method according to claim 2,
wherein the taste improver is added to the foodstuff so that, upon adding the taste improver to the foodstuff, a concentration of the vegetable extract as a solid content relative to the foodstuff or a concentration of the phospholipid, in the foodstuff is in a range from 0.001 to 1 percent by weight relative to the foodstuff.

7. The taste improvement method according to claim 1, wherein the vegetable extract comprises apigenin, glycoside of apigenin, or a combination of apigenin and a glycoside of apigenin.

8. The taste improvement method according to claim 1, wherein the vegetable extract is an extract of any of paprika, asparagus, burdock, tomato, bitter melon, parsley, green soybean, purple-fleshed sweet potato, carrot, garland *chrysanthemum*, spinach, barley grass, Angelica keiskei, mulberry leaves, Japanese radish, Corchorus olitorius, kale, yam, broccoli, green pepper, and celery.

9. The taste improvement method according to claim 1, wherein the vegetable extract is extracted using water, ethanol, or a combination thereof.

10. The taste improvement method according to claim 1, wherein the taste improver further comprises a basic amino acid.

11. The taste improvement method according to claim 10, wherein the basic amino acid is arginine.

12. The taste improvement method according to claim 1, wherein the taste improver further comprises a saccharide.

13. The taste improvement method according to claim 12, wherein the saccharide is trehalose, a hydrogenated starch syrup, or a combination thereof.

14. The method according to claim 1,
wherein the taste improver is added to the foodstuff so that, upon adding the taste improver to the foodstuff, a concentration of the vegetable extract in the foodstuff as a solid content is in a range from 0.001 to 1 percent by weight relative to the foodstuff.

15. The method according to claim 14,
wherein the taste improver optionally contains a phospholipid
wherein, upon adding a saccharide, a basic amino acid, or a combination thereof to the foodstuff together with the vegetable extract and optionally with the phospholipid as the taste improver, a content of the saccharide if added is in a range from 2 to 100 parts by weight relative to 1 part by weight of the added vegetable extract or a combination of the vegetable extract and the phospholipid, respectively, and
a content of the abasic amino acid if added is in a range from 0.1 to 10 parts by weight relative to 1 part by weight of the added vegetable extract or the added combination of the vegetable extract and the phospholipid, respectively.

16. salt substitute comprising a taste improver comprising as an active ingredient, a vegetable extract, which comprises at least one material selected from the group consisting of apigenin, daidzin, and a glycoside of apegenin,
wherein the taste improver is contained in the salt substitute in an amount range from 0.001 to 1 part by weight as a solid content of the vegetable extract relative to 1 part of a total amount of at least one salt selected from the group consisting of a potassium salt, a magnesium salt, a calcium salt, and/or an ammonium salt, contained in the salt substitute.

17. The salt substitute according to claim 16, further comprising a phospholipid, arginine, or a combination thereof,
wherein an amount of the phospholipid if contained is in a range from 0.001 to 1 part by weight and an amount of the arginine if contained is in a range from 0.02 to 2.5 parts by weight, relative to 1 part of a total amount of a potassium salt, a magnesium salt, a calcium salt, and an ammonium salt in the salt substitute.

18. A taste improvement method for a foodstuff comprising at least one salt selected from the group consisting of a potassium salt, a magnesium salt, a calcium salt, and an ammonium salt,
the taste improvement method comprising adding a taste improver comprising as an active ingredient, at least one material selected from the group consisting of apigenin, daidzin, and a glycoside of apigenin, to the foodstuff.

19. The taste improvement method according to claim 18 wherein the foodstuff comprises apigenin, daidzin, or a glycoside of apigenin in an amount from 10 ppm to 150 ppm.

* * * * *